(12) United States Patent
Shimamura et al.

(10) Patent No.: US 9,869,979 B2
(45) Date of Patent: Jan. 16, 2018

(54) COMPUTATION UNIT, OUTPUT CONTROL METHOD, AND PROGRAM

(75) Inventors: Junji Shimamura, Osaka (JP); Hiroshi Sawaragi, Shiga (JP); Takaaki Yamada, Shiga (JP)

(73) Assignee: OMRON CORPORATION, Kyoto-Shi, Kyoto (JP)

( * ) Notice: Subject to any disclaimer, the term of this patent is extended or adjusted under 35 U.S.C. 154(b) by 827 days.

(21) Appl. No.: 14/005,288

(22) PCT Filed: Mar. 22, 2011

(86) PCT No.: PCT/JP2011/056780
§ 371 (c)(1),
(2), (4) Date: Nov. 4, 2013

(87) PCT Pub. No.: WO2012/124144
PCT Pub. Date: Sep. 20, 2012

(65) Prior Publication Data
US 2014/0088767 A1  Mar. 27, 2014

(30) Foreign Application Priority Data
Mar. 15, 2011 (JP) ................. 2011-056769

(51) Int. Cl.
  *G05B 15/02* (2006.01)
  *G05B 19/05* (2006.01)
(52) U.S. Cl.
  CPC .......... *G05B 15/02* (2013.01); *G05B 19/056* (2013.01); *G05B 2219/42189* (2013.01)

(58) Field of Classification Search
  CPC .................. G05B 15/02; G05B 19/056; G05B 2219/36171; G05B 2219/50233; G05B 2219/43174; G05B 2219/42189
  (Continued)

(56) References Cited

U.S. PATENT DOCUMENTS 5,642,024 A * 6/1997 Okada .................. G05B 19/416
                                                    318/568.1
6,133,705 A   10/2000 Inoue et al.
(Continued)

FOREIGN PATENT DOCUMENTS

JP      8-126375        5/1996
JP      8-339218        12/1996
(Continued)

OTHER PUBLICATIONS

JP Patent Publication No. 03-296109 (Kazuo), published on Dec. 26, 1991, p. 1-5.*
(Continued)

*Primary Examiner* — Christopher E. Everett
(74) *Attorney, Agent, or Firm* — Greenblum & Bernstein, P.L.C.

(57) ABSTRACT

A CPU unit of PLC executes a motion control and a sequence control. The CPU unit stores a control program for executing the motion control using a CAM table, and a first CAM table and a second CAM table. When a microprocessor receives a predetermined instruction during execution of the control program, the microprocessor switches the CAM table used in the execution of the control program from the first CAM table to the second CAM table. On the basis of the switching of the CAM table, the microprocessor outputs the execution results of the control program using the second CAM table to an apparatus to be controlled.

14 Claims, 24 Drawing Sheets

(58) Field of Classification Search
USPC .......................................................... 700/275
See application file for complete search history.

(56) References Cited

U.S. PATENT DOCUMENTS

| | | | | |
|---|---|---|---|---|
| 6,246,201 B1* | 6/2001 | Aderek | ................ | G05B 19/416 318/560 |
| 2006/0144187 A1 | 7/2006 | Maeda | | |

FOREIGN PATENT DOCUMENTS

| | | |
|---|---|---|
| JP | 9-57949 | 3/1997 |
| JP | 9-289788 | 11/1997 |
| JP | 10-174478 | 6/1998 |
| JP | 11-110047 | 4/1999 |
| JP | 2006-293692 | 10/2006 |
| JP | 2007-11936 | 1/2007 |
| JP | 2007-140655 | 6/2007 |
| JP | 2007-328796 | 12/2007 |
| JP | 2009-237818 | 10/2009 |
| JP | 2009-289058 | 12/2009 |

OTHER PUBLICATIONS

Chinese Patent Publication, CN201730649 (Li), published on Feb 2, 2011, p. 1-4.*
JP Patent Publication No. 2009-289058 (SAT), published on Dec. 10, 2009, p. 1-23.*
Robert L. Norton, "Cam Design and Manufacturing Handbook", Industrial Press, Inc., pp. 326-331 (2009).
Tadakatsu Aida, "Controller no Motion Control System eno Tekiyo", Fuji Electric Journal, vol. 75, No. 12, Dec. 2002, pp. 677-682
"Technical Specification PLCopen—Technical Committee 2—Task Force, Function blocks for motion control (Formerly Part 1 and Part 2), PLCopen Working Draft, Version 1.99—Release for comments—till Aug. 16, 2010," May 21, 2010.
U.S. Appl. No. 14/005,298 to Junji Shimamura et al., filed Sep. 16, 2013.
International Search report for PCT/2011/056780, dated Apr. 19, 2011.

* cited by examiner

Fig. 13

| Index | Phase θ | Displacement δ |
|---|---|---|
| 0 | 0.0 | 0.0 |
| 1 | 0.1 | 1.0 |
| 2 | 0.2 | 5.0 |
| ... | ... | ... |
| k | 270.0 | 400.0 |
| ... | ... | ... |
| 3598 | 359.8 | 10.0 |
| 3599 | 359.9 | 5.0 |
| 3600 | 360.0 | 0.0 |
|  | 0.0 | 0.0 |
|  | 0.0 | 0.0 |
|  | ⋮ | ⋮ |
|  | 0.0 | 0.0 |

520

← Starting point of CAM table

← Terminating point of CAM table

Significant CAM data (number)

Non-significant CAM data

Maximum number of CAM data

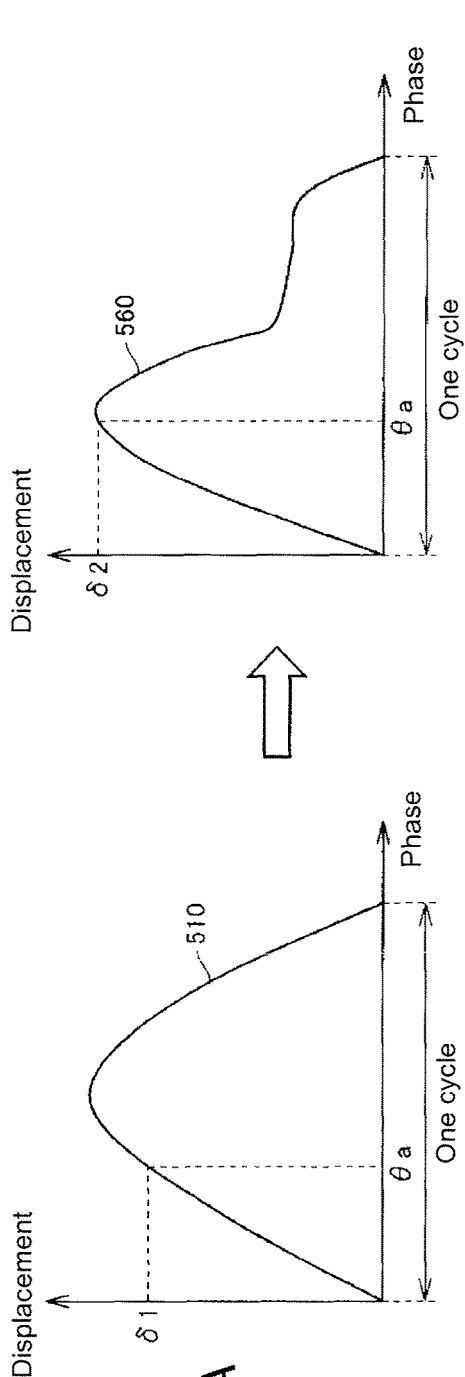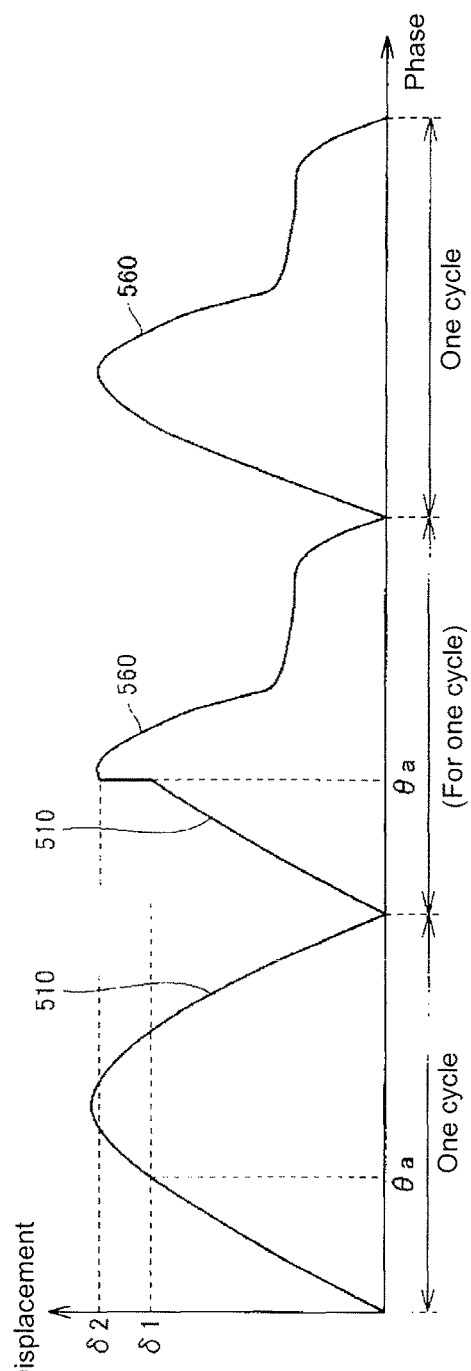
FIG. 14A
FIG. 14B

Fig. 23

| Enumerator | Meaning |
|---|---|
| _mcCTNone | No smoothing function |
| _mcCTMaxAccDec | Suppress at maximum acceleration (error if not finished in one period of electronic cam) |
| _mcCTMaxAccDecCyclic | Suppress at maximum acceleration (carry over to next cycle if not finished in one period of electronic cam) |
| _mcCTFiltering | Use smoothing filter (error if not finished in one period of electronic cam) |
| _mcCTFilteringCyclic | Use smoothing filter (carry over to next cycle if not finished in one period of electronic cam) |
| _mcCTPoly5 | Interpolate with fifth-order polynomial equation |

COMPUTATION UNIT, OUTPUT CONTROL METHOD, AND PROGRAM

TECHNICAL FIELD

The present invention relates to computation units, output control methods, and programs of a programmable logic controller, and in particular, to a computation unit for executing a motion control and a sequence control, an output control method in the computation unit, and a program for controlling the computation unit.

BACKGROUND ART

A PLC (Programmable Logic Controller) is, for example, configured by a plurality of units such as a CPU (Central Processing Unit) including a microprocessor for executing a user program, and an IO (Input Output) unit responsible for signal input from external switches and sensors and signal output to external relays and actuators. The PLC executes a control operation while exchanging data via a PLC system bus and/or field network among the units for every execution cycle of the user program.

The control of operations of machineries, facilities, and the like sometimes include a motion control for controlling the motion of a motor. Conventionally, in such motion control, control processing (execution of motion computation program) for periodically outputting a command value to a motor driver, which drives a motor, is typically carried out in a motion controller arranged separate from the PLC. However, increase in speed of the microprocessor and the communication network is progressing in the field of information technology. Thus, not only the user program, but also the motion computation program can be executed in one microprocessor in the PLC using such techniques.

For example, Patent Document 1 discloses a configuration of processing a motion control function of controlling a motor and a PLC function of executing a sequence computation (user program) with one CPU. More specifically, Patent Document 1 discloses executing "fixed-period motion control processing and each axis processing" and "high speed sequence processing" for every cycle of a basic clock, and furthermore, executing "low speed sequence processing" or "non-fixed period motion control processing" in the remaining time of each basic clock cycle.

An electronic cam is sometimes used in the motion control. The electronic cam realizes the operation of a mechanical CAM in electronic control, so that tooling change of the CAM, fine-tuning of the CAM shape, and the like can be freely and easily carried out. Non-patent Document 1 describes a CAM table for realizing the electronic cam. Non-patent Document 1 also describes a CAM variable.

Patent document 2 discloses an electronic cam control device. The electronic cam control device includes a stroke bottom dead point setting unit, an addition movement amount setting unit, a position command calculating unit, and a stroke bottom dead point changing unit. The addition movement amount setting unit sets addition movement data for changing the stroke bottom dead point position. When the stroke bottom dead point change command is input, the position command calculating unit sequentially adds the addition movement amount corresponding to the stroke bottom dead point position set in the stroke bottom dead point setting unit and the addition movement data set in the addition movement amount setting unit to a CAM positioning amount A, and sequentially outputs the addition result as a position command value with respect to an output shaft. When the stroke bottom dead point change command is input, the stroke bottom dead point changing unit sequentially adds the addition movement amount corresponding to the addition movement data set in the addition movement amount setting unit to the stroke bottom dead point position set in the stroke bottom dead point setting unit, and sequentially updates the stroke bottom dead point position set in the stroke bottom dead point setting unit with the addition result.

Patent Document 3 discloses a positioning control system of a motor. The positioning control system of the motor updates a movement actual time $R_{ti}$ for every frequency dividing period, obtains a dimensionless time $t_i$ from the updated movement actual time $R_{ti}$, and obtains a dimensionless position $S_{ij}$ corresponding to the dimensionless time $t_i$ using a CAM curve table. The positioning control system of the motor obtains an actual position $s_{ij}$ by multiplying a stroke $h_j$ to the obtained dimensionless position $S_{ij}$. The positioning control system of the motor carries out the computation of obtaining the actual position $s_{ij}$ for the selected N CAM curves. The positioning control system of the motor adds the obtained N actual positions $s_{ij}$. The positioning control system of the motor feedback controls a rotation position of the motor with a difference $s_{Ti} - s_{Ti-1}$ of an addition value $s_{Ti}$ and an addition value $s_{T-1}$ obtained in the previous frequency dividing period as a command value.

Patent documents 4 to 6 disclose a device for synchronously driving a main shaft motor and a dependent shaft motor.

Patent Document 1: Japanese Unexamined Patent Publication No. 2007-140655
Patent Document 2: Japanese Unexamined Patent Publication No. 2006-293692
Patent Document 3: Japanese Unexamined Patent Publication No. 8-339218
Patent Document 4: Japanese Unexamined Patent Publication No. 8-126375
Patent Document 5: Japanese Unexamined Patent Publication No. 9-289788
Patent document 6: Japanese Unexamined Patent Publication No. 10-174478
Non-patent Document 1: Technical Specification PLC open—Technical Committee 2—Task Force, Function blocks for motion control (Formerly Part 1 and Part 2), PLC open Working Draft, Version 1.99—Release for comments—till Aug. 16, 2010

SUMMARY OF THE INVENTION

Problems to be Solved by the Invention

In the prior art, when switching CAM tables corresponding to the type of work, the operation of the driven shaft needed to be stopped once. Thus, the time in which the driven shaft is stopped becomes a waste time. Non-patent document 1 does not disclose the specific content on the switching of the CAM table.

In view of the problems described above, it is an object of the invention of the present application to provide a computation unit of a PLC capable of rapidly carrying out switching of the CAM table, an output control method, and a program.

Means for Solving the Problem

In accordance with one aspect of the present invention, a computation unit of a programmable logic controller is configured to execute a motion control and a sequence control. The computation unit includes: a processor; and a memory configured to store a program for perform the motion control using a CAM table in which a displacement of a subordination of an electronic cam is associated with each phase of a main shaft of the electronic cam, and a first CAM table and a second CAM table serving as the CAM table. The processor is configured to execute the program using the first CAM table, and output the execution results to an apparatus to be controlled associated with the driven shaft. The processor is configured to switch, when receiving a predetermined instruction during the execution of the program, a CAM table used in the execution of the program from the first CAM table to the second CAM table. The processor is configured to output the execution results of the program using the second CAM table to the apparatus to be controlled on the basis of the switching.

Preferably, the memory comprises a nonvolatile memory and a volatile memory. The nonvolatile memory stores the first CAM table and the second CAM table. The processor is configured to read out the first CAM table and the second CAM table from the nonvolatile memory and develop the read CAM tables in the volatile memory. The processor is configured to execute the program using the developed first CAM table before receiving the predetermined instruction. The processor is configured to execute the program using the developed second CAM table when receiving the predetermined instruction after the development.

Preferably, when switching the CAM table used in the execution of the program from the first CAM table to the second CAM table, the processor executes the program using a displacement associated with a phase in the second CAM table greater than a phase in the first CAM table at the time of the switching.

Preferably, the memory further stores an upper limit value related to acceleration and an upper limit value related to deceleration. The processor is configured to limit the acceleration of the apparatus to be controlled to the upper limit value related to acceleration when the acceleration of the apparatus to be controlled immediately after the switching is greater than the upper limit value related to acceleration. The processor is configured to limit the deceleration of the apparatus to be controlled to the upper limit value related to deceleration when the deceleration of the apparatus to be controlled immediately after the switching is greater than the upper limit value related to deceleration.

Preferable, the memory further stores a smoothing filter configured to smooth the CAM table. The processor is configured to perform the smoothing processing with the smoothing filter on the displacement in the second CAM table immediately after the switching.

Preferably, the memory further stores a high-order polynomial equation of third or higher orders. The processor is configured to perform the smoothing processing with the high order polynomial equation on the displacement in the second CAM table immediately after the switching.

Preferably, the processor is configured to perform processing of compensating lack of movement amount of the apparatus to be controlled that occurs when a control in which the displacement of the second CAM table is not output is performed in one or a plurality of CAM periods of the electronic cam in the motion control.

Preferably, the processor receives an instruction specifying whether to process as an error or to perform the processing of compensating the lacking amount in the next CAM period if the lack of movement amount cannot be compensated in one CAM period.

Preferably, the program includes a motion computation program, and a user program for performing the processing of giving an instruction necessary for the execution of the motion computation program to the motion computation program. The processor is configured to repeat the execution of the motion computation program for every first constant period. The processor is configured to repeat the execution of the user program for every second constant period, which is an integral multiple of the first constant period. The program for performing the switching in the user program is described in a task of a first constant period or a task of a second constant period.

In accordance with another aspect of the present invention, an output control method is an output control method in a computation unit of a programmable logic controller configured to execute a motion control and a sequence control. The computation unit stores a program for performing the motion control using a CAM table in which a displacement of a driven shaft of an electronic cam is associated with each phase of a main shaft of the electronic cam, and a first CAM table and a second CAM table serving as the CAM table. The output control method includes the steps of: a processor of the computation unit executing the program using the first CAM table, and outputting the execution results to an apparatus to be controlled associated with the driven shaft; the processor, when receiving a predetermined instruction during the execution of the program, switching a CAM table used in the execution of the program from the first CAM table to the second CAM table; and the processor outputting the execution results of the program using the second CAM table to the apparatus to be controlled on the basis of the switching.

In accordance with still another aspect of the present invention, a program is a program for controlling a computation unit of a programmable logic controller configured to execute a motion control and a sequence control. The computation unit stores a program for performing the motion control using a CAM table in which a displacement of a driven shaft of an electronic cam is associated with each phase of a main shaft of the electronic cam, and a first CAM table and a second CAM table serving as the CAM table. The program causes the computation unit to perform the steps of: executing the program using the first CAM table, and outputting the execution results to an apparatus to be controlled associated with the driven shaft; switching, when receiving a predetermined instruction during the execution of the program, a CAM table used in the execution of the program from the first CAM table to the second CAM table; and outputting the execution results of the program using the second CAM table to the apparatus to be controlled on the basis of the switching.

Effect of the Invention

According to the present invention, the switching of the CAM table can be rapidly carried out.

BRIEF DESCRIPTION OF THE DRAWINGS

FIG. 13 is a view showing a CAM table;

FIGS. 14A and 14B are views describing a switching processing of the CAM table;

FIG. 23 is a view describing a smoothing pattern of when performing the smoothing processing;

MODE FOR CARRYING OUT THE INVENTION

Figure 1:
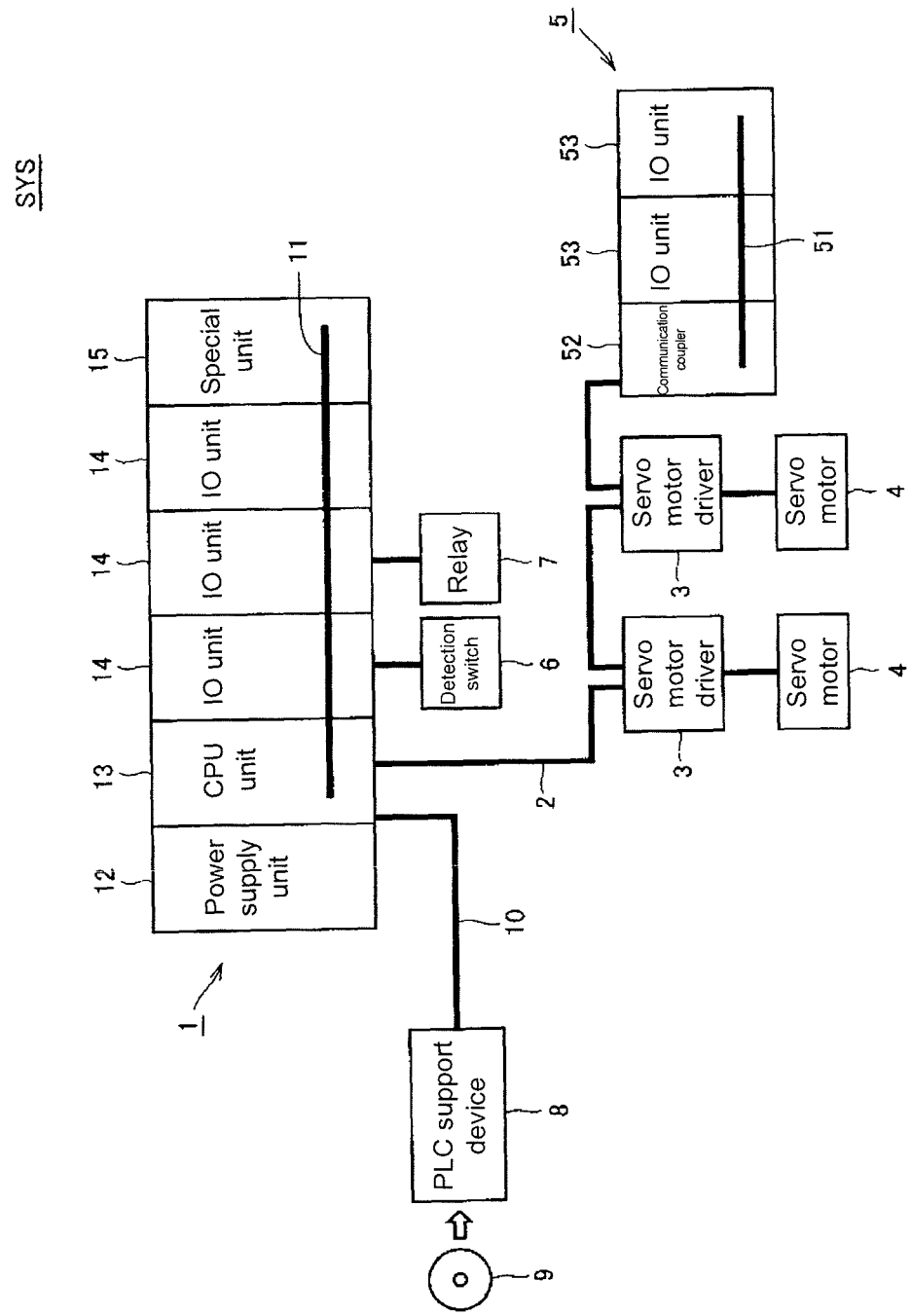
FIG. 1 is a schematic view showing a schematic configuration of a PLC system.

An embodiment of the present invention will be described in detail with reference to the drawings. The same reference numerals are denoted on the same or corresponding portions in the figures, and the description thereof will not be repeated.

<A. System Configuration>

A PLC according to the present embodiment has a motion control function for controlling the motion of the motor. First, a system configuration of a PLC 1 according to the present embodiment will be described with reference to FIG. 1.

FIG. 1 is a schematic view showing a schematic configuration of a PLC system according to the embodiment of the present invention. With reference to FIG. 1, a PLC system SYS includes the PLC 1, a servo motor driver 3 and a remote IO terminal 5 connected to the PLC 1 by way of a field network 2, and a detection switch 6 and a relay 7, which are field devices. A PLC support device 8 is also connected to the PLC 1 by way of a connection cable 10, and the like.

The PLC 1 includes a CPU unit 13, which executes main computation processing, one or more IO units 14, and a special unit 15. Such units are configured to be able to exchange data with each other through a PLC system bus 11. A power supply of an appropriate voltage is supplied to the units by a power supply unit 12. Each unit configured as the PLC 1 is provided by the PLC manufacturing company, and thus the PLC system bus 11 is generally uniquely developed by each PLC manufacturing company and used. As will be described later, the standard, and the like of the field network 2, on the other hand, are often publicized so that products from different manufacturing companies can be connected.

Figure 2:
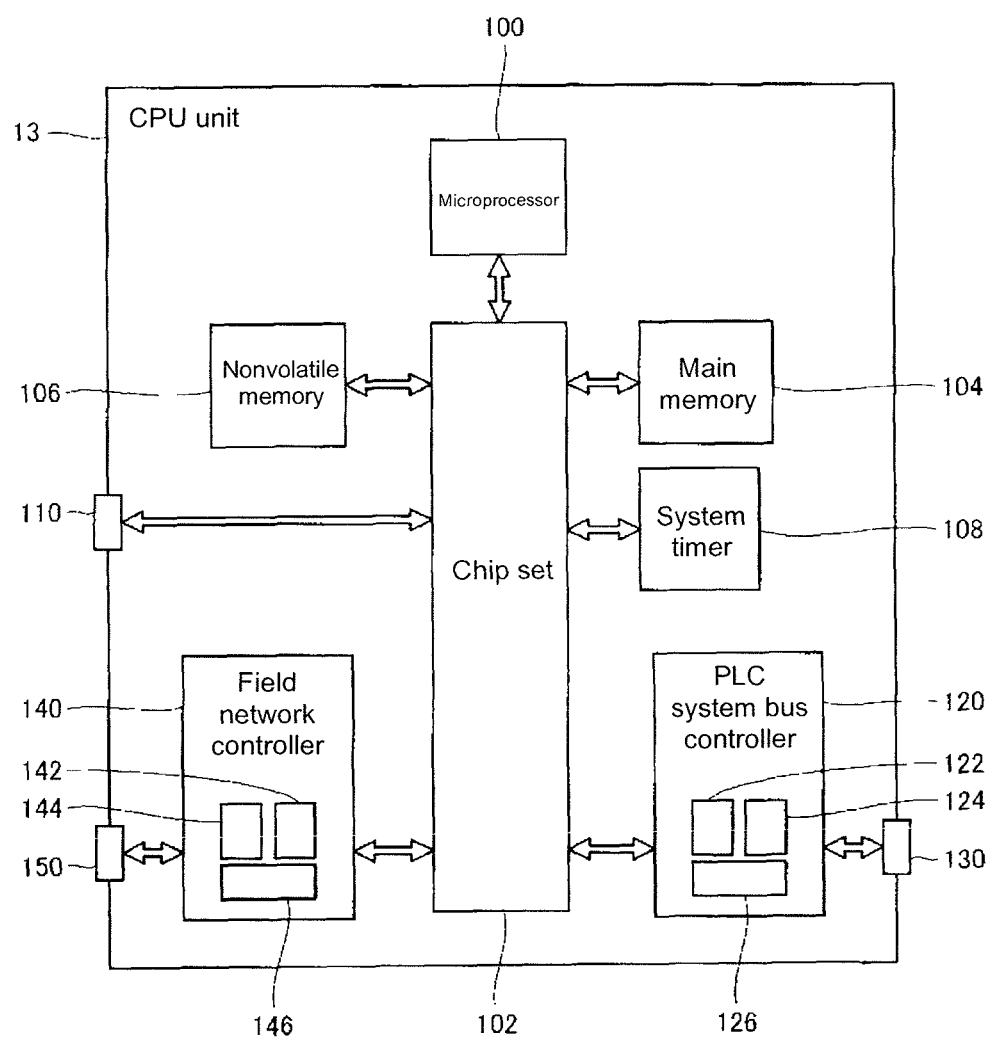
FIG. 2 is a schematic view showing a hardware configuration of a CPU unit.

The details of the CPU unit 13 will be described later with reference to FIG. 2.

The IO unit 14 is a unit associated with general input/output processing, and is responsible for the input/output of binarized data such as ON/OFF. In other words, the IO unit 14 collects information on whether a state (ON) in which a sensor such as the detection switch 6 is detecting some kind of object or a state (OFF) in which the sensor is not detecting any object. The IO unit 14 outputs either a command (ON) for activation or a command (OFF) for deactivation to an output destination such as the relay and the actuator.

The special unit 15 has functions that are not supported by the IO unit 14 such as input/output of analog data, temperature control, and communication by specific communication method.

The field network 2 transmits various types of data exchanged with the CPU unit 13. Various types of industrial Ethernet (registered trademark) can be typically used for the field network 2. For example, EtherCAT (registered trademark), Profinet IRT, MECHATROLINK (registered trademark)-III, Powerlink, SERCOS (registered trademark)-III, CIP Motion, and the like are known for the industrial Ethernet (registered trademark), and any one of the above may be adopted. The field network other than the industrial Ethernet (registered trademark) may also be used. For example, DeviceNet, CompoNet/IP (registered trademark), and the like may be used if the motion control is not carried out. In the PLC system SYS according to the present embodiment, the configuration of when adopting the EtherCAT (registered trademark), which is the industrial Ethernet (registered trademark), for the field network 2 will be typically illustrated in the present embodiment.

In FIG. 1, the PLC system SYS including both the PLC system bus 11 and the field network 2 is illustrated, but a system configuration mounted with only one of the PLC system bus 11 or the field network 2 may be adopted. For example, all the units may be connected with the field network 2. Alternatively, the field network 2 may not be used, and the servo motor driver 3 may be directly connected to the PLC system bus 11. Furthermore, the communication unit of the field network 2 may be connected to the PLC system bus 11, and communication with the apparatus connected to the field network 2 from the CPU unit 13 through such communication unit may be carried out.

The servo motor driver 3 is connected to the CPU unit 13 through the field network 2, and drives a servo motor 4 according to a command value from the CPU unit 13. More specifically, the servo motor driver 3 receives command values such as position command value, speed command value, and torque command value at a constant period from the PLC 1. The servo motor driver 3 also acquires an actual measurement value related to the operation of the servo motor 4 such as position, speed (typically calculated from the difference of current position and previous position), and torque from a detector such as a position sensor (rotary encoder) and a torque sensor connected to the shaft of the servo motor 4. The servo motor driver 3 then sets the command value from the CPU unit 13 as a target value, and performs the feedback control with the actual measurement value as a feedback value. In other words, the servo motor driver 3 adjusts the current for driving the servo motor 4 so that the actual measurement value approaches the target value. The servo motor driver 3 is sometimes referred to as a servo motor amplifier.

FIG. 1 shows a system example in which the servo motor 4 and the servo motor driver 3 are combined, but other configurations, for example, a system in which a pulse motor and a pulse motor driver are combined may be adopted.

The remote IO terminal 5 is also connected to the field network 2 of the PLC system SYS shown in FIG. 1. The remote IO terminal 5 basically performs processing associated with the general input/output processing, similar to the IO unit 14. More specifically, the remote IO terminal 5 includes a communication coupler 52 for performing processing associated with data transmission on the field network 2, and one or more IO units 53. Such units are configured to be able to exchange data with each other through a remote IO terminal bus 51.

The PLC support device 8 will be described later.

<B. Hardware Configuration of CPU Unit>

The hardware configuration of the CPU unit 13 will now be described with reference to FIG. 2. FIG. 2 is a schematic view showing a hardware configuration of the CPU unit 13 according to the embodiment of the present invention. With reference to FIG. 2, the CPU unit 13 includes a microprocessor 100, a chip set 102, a main memory 104, a non-volatile memory 106, a system timer 108, a PLC system bus controller 120, a field network controller 140, and a USB connector 110. The chip set 102 and the other components are respectively connected through various buses.

The microprocessor 100 and the chip set 102 are typically configured according to versatile computer architecture. In other words, the microprocessor 100 interprets and executes an instruction code sequentially provided according to an internal clock from the chip set 102. The chip set 102 exchanges internal data with various components connected thereto and also generates the instruction code necessary for the microprocessor 100. Furthermore, the chip set 102 has a function of cashing data, and the like obtained as a result of executing the computation processing in the microprocessor 100.

The CPU unit 13 includes the main memory 104 and the non-volatile memory 106 as storage units.

The main memory 104 is a volatile storage region (RAM) and holds various types of programs to be executed by the microprocessor 100 after turning ON the CPU unit 13. The main memory 104 is also used as a work memory when the microprocessor 100 executes the various types of programs. Devices such as DRAM (Dynamic Random Access Memory) and SRAM (Static Random Access Memory) are used for the main memory 104.

The non-volatile memory 106 holds, in a non-volatile manner, data such as real time OS (Operating System), system program, user program, motion computation program, and data such as system setting parameter of the PLC 1. Such programs and data are copied onto the main memory 104, as necessary, so as to be accessible by the microprocessor 100. A semiconductor memory such as a flash memory can be used for the non-volatile memory 106. Alternatively, a magnetic recording medium such as a hard disc drive, an optical recording medium such as a DVD-RAM (Digital Versatile Disk Random Access Memory), and the like can also be used.

The system timer 108 generates an interrupt signal for every constant period and provides the same to the microprocessor 100. The interrupt signal is typically generated in a plurality of different periods depending on the specification of the hardware, but the interrupt signal may be set to be generated in an arbitrary period by the OS (Operating System), BIOS (Basic Input Output System), and the like. The control operation for every motion control cycle, as will be described later, is realized using the interrupt signal generated by the system timer 108.

The CPU unit 13 includes the PLC system bus controller 120 and the field network controller 140 as communication circuits.

A buffer memory 126 functions as a transmission buffer of the data (hereinafter also referred to as "output data") output to another unit through the PLC system bus 11, and a reception buffer of the data (hereinafter also referred to as "input data") input from another unit through the PLC system bus 11. The output data created by the computation processing of the microprocessor 100 is primitively stored in the main memory 104. The output data to be transferred to a specific unit is read out from the main memory 104, and primarily held in the buffer memory 126. The input data transferred from another unit is primarily held in the buffer memory 126, and then transferred to the main memory 104.

A DMA control circuit 122 performs transfer of the output data from the main memory 104 to the buffer memory 126, and transfer of the input data from the buffer memory 126 to the main memory 104.

A PLC system bus control circuit 124 performs processing of transmitting the output data of the buffer memory 126 and processing of receiving the input data and storing the input data in the buffer memory 126 with another unit connected to the PLC system bus 11. The PLC system bus control circuit 124 typically provides functions of the physical layer and the data link layer in the PLC system bus 11.

The field network controller 140 controls the exchange of data through the field network 2. In other words, the field network controller 140 controls the transmission of the output data and the reception of the input data according to the standard of the field network 2 being used. As described above, the field network 2 complying with the EtherCAT (registered trademark) standard is adopted in the present embodiment, and hence the field network controller 140 including hardware for carrying out the normal Ethernet (registered trademark) communication is used. In the EtherCAT (registered trademark) standard, a general Ethernet (registered trademark) controller that realizes the communication protocol complying with the normal Ethernet (registered trademark) standard can be used. However, the Ethernet (registered trademark) controller of a special specification corresponding to the communication protocol of a dedicated specification different from the normal communication protocol is used depending on the type of industrial Ethernet (registered trademark) adopted for the field network 2. Furthermore, if the field network other than the industrial Ethernet (registered trademark) is adopted, a dedicated field network controller corresponding to such standard is used.

A DMA control circuit 142 performs transfer of the output data from the main memory 104 to the buffer memory 146, and transfer of the input data from the buffer memory 146 to the main memory 104.

A field network control circuit 144 performs processing of transmitting the output data of the buffer memory 146 and processing of receiving the input data and storing the input data in the buffer memory 146 with another device connected to the field network 2. The field network control circuit 144 typically provides functions of the physical layer and the data link layer in the field network 2.

The USB connector 110 is an interface for connecting the PLC support device 8 and the CPU unit 13. Typically, the programs, and the like transferred from the PLC support device 8 and executable by the microprocessor 100 of the CPU unit 13 are retrieved to the PLC 1 through the USB connector 110.

<C. Software Configuration of CPU Unit>

The software group for providing various functions according to the present embodiment will now be described with reference to FIG. 3. The instruction code contained in the software is read out at an appropriate timing, and executed by the microprocessor 100 of the CPU unit 13.

Figure 3:
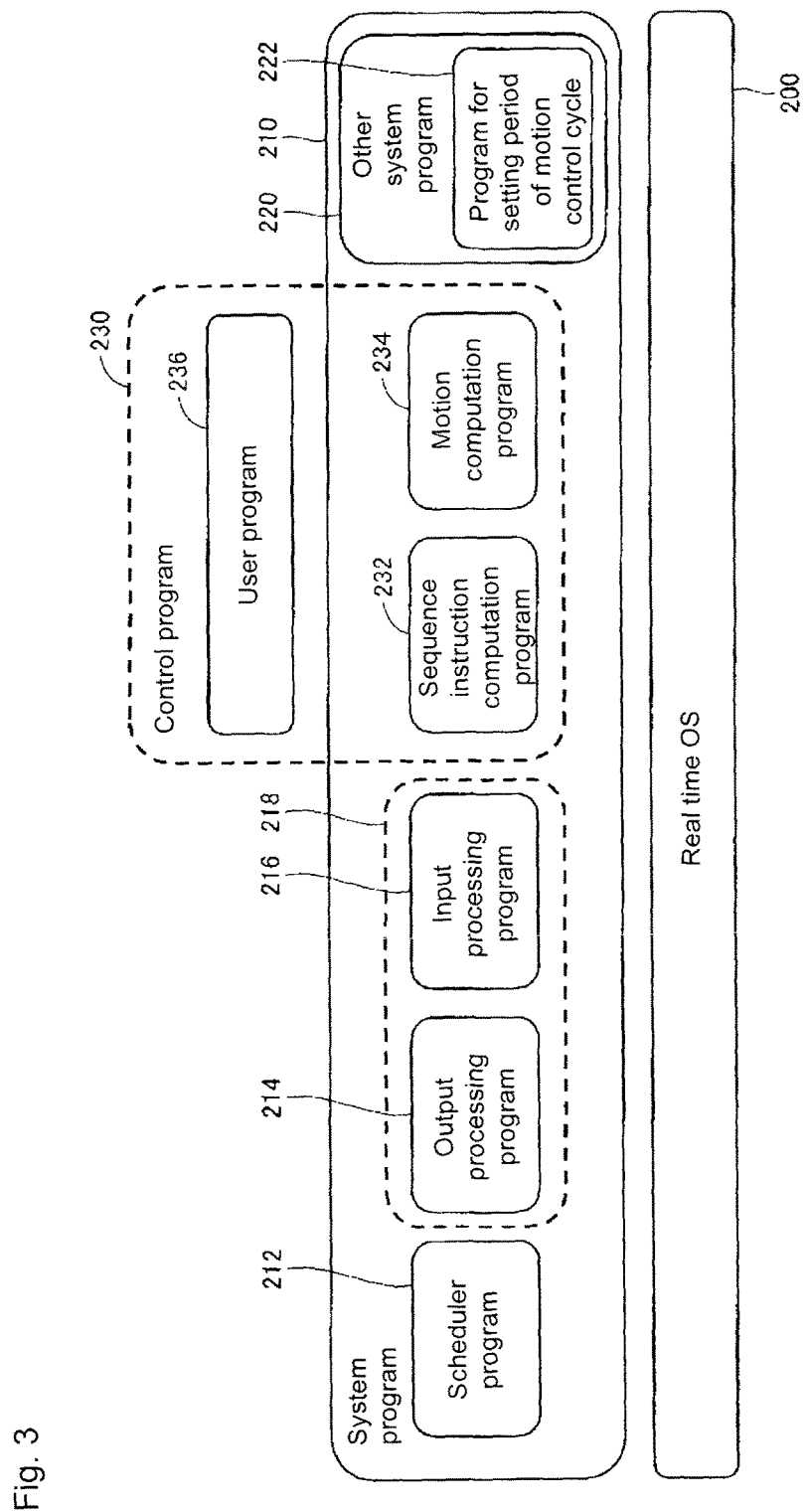
FIG. 3 is a schematic view showing a software configuration executed by the CPU unit.

FIG. 3 is a schematic view showing the software configuration executed by the CPU unit 13 according to the embodiment of the present invention. With reference to FIG. 3, the software executed by the CPU unit 13 has three hierarchies, a real time OS 200, a system program 210, and a user program 236.

The real time OS 200 is designed according to the computer architecture of the CPU unit 13, and provides the basic execution environment for the microprocessor 100 to execute the system program 210 and the user program 236. The real time OS is typically provided by the manufacturing company of the PLC, the specialized software company, and the like.

The system program 210 is a software group for providing the functions of the PLC 1. Specifically, the system program 210 includes a scheduler program 212, an output processing program 214, an input processing program 216, a sequence instruction computation program 232, a motion computation program 234, and other system program 220. Generally, the output processing program 214 and the input processing program 216 are successively (integrated manner) executed, and thus the output processing program and the input processing program are sometimes collectively referred to as an IO processing program 218.

The user program 236 is created according to the control purpose of the user. In other words, the user program 236 is a program arbitrarily designed according to a target line (process), and the like to be controlled using the PLC system SYS.

As will be hereinafter described, the user program 236 cooperatively operates with the sequence instruction computation program 232 and the motion computation program 234 to realize the control purpose of the user. In other words, the user program 236 uses instructions, functions, function modules, and the like provided by the sequence instruction computation program 232 and the motion computation program 234 to realize a programmed operation. Thus, the user program 236, the sequence instruction computation program 232, and the motion computation program 234 are sometimes collectively referred to as a control program 230.

The microprocessor 100 of the CPU unit 13 executes the system program 210 and the user program 236 stored in the storage unit in the above manner.

Hereinafter, each program will be more specifically described.

As described above, the user program 236 is created according to the control purpose (e.g., target line and process) of the user. The user program 236 is typically in an object program format executable by the microprocessor 100 of the CPU unit 13. The user program 236 is generated when the source programs described by the ladder language, and the like are complied in the PLC support device 8, and the like. The generated user program 236 in the object program format is transferred from the PLC support device 8 to the CPU unit 13 through the connection cable 10, and stored in the non-volatile memory 106, and the like.

The scheduler program 212 controls the start of the processing and the resuming of the processing after the processing is interrupted in each execution cycle for the output processing program 214, the input processing program 216, and the control program 230. More specifically, the scheduler program 212 controls the execution of the user program 236 and the motion computation program 234.

In the CPU unit 13 according to the present embodiment, the execution cycle (motion control cycle) of a constant period suited for the motion computation program 234 is adopted as a common cycle for the entire processing. It is thus difficult to complete all processing within one motion control cycle, and hence the processing is divided to the processing in which the execution is to be completed in each motion control cycle and the processing in which the execution may be carried out over a plurality of motion control cycles according to priority, and the like of the processing to be executed. The scheduler program 212 manages the execution order, and the like of the divided processing. More specifically, the scheduler program 212 executes the program with higher priority first within each motion control cycle period.

The output processing program 214 rearranges the output data generated by the execution of the user program 236 (control program 230) to a format suited for transfer to the PLC system bus controller 120 and/or the field network controller 140. If the PLC system bus controller 120 or the field network controller 140 requires an instruction to execute the transmission from the microprocessor 100, the output processing program 214 issues such instruction.

The input processing program 216 rearranges the input data received by the PLC system bus controller 120 and/or the field network controller 140 to a format suited for use by the control program 230.

The sequence instruction computation program 232 is a program that is called out when a certain type of sequence instruction used in the user program 236 is executed, and executed to realize the content of such instruction.

The motion computation program 234 is a program executed according to the instruction from the user program 236, and calculates a command value to output to the servo motor driver 3 and the motor driver such as the pulse motor driver.

Other system program 220 collectively indicates the program group for realizing the various types of functions of the PLC 1 other than the programs individually shown in FIG. 3. The other system program 220 includes a program 222 for setting the period of the motion control cycle.

The period of the motion control cycle can be appropriately set according to the control purpose. Typically, the user inputs the information specifying the period of the motion control cycle to the PLC support device 8. The input information is then transferred from the PLC support device 8 to the CPU unit 13. The program 222 for setting the period of the motion control cycle stores the information from the PLC support device 8 in the non-volatile memory 106, and sets the system timer 108 so that the interrupt signal is generated in the period of the motion control cycle specified from the system timer 108. When the program 222 for setting the period of the motion control cycle is executed at the time of turning ON the CPU unit 13, the information specifying the period of the motion control cycle is read out from the non-volatile memory 106, and the system timer 108 is set according to the read information.

A value of time indicating the period of the motion control cycle, information (number or character) that specifies one of a plurality of options prepared in advance related to the period of the motion control cycle, and the like, may be adopted for the format of the information specifying the period of the motion control cycle.

In the CPU unit 13 according to the present embodiment, the means for setting the period of the motion control cycle corresponds to an element used to arbitrarily set the period of the motion control cycle such as the communication unit with the PLC support device 8 used to acquire the information specifying the period of the motion control cycle, the program 222 for setting the period of the motion control cycle, and the configuration of the system timer 108 configured to be able to arbitrarily set the period of the interrupt signal defining the motion control cycle.

The real time OS 200 provides an environment for switching the plurality of programs with elapse of time and executing the relevant program. In the PLC 1 of the present embodiment, an output preparation interruption (P) and a field network transmission interruption (X) are initially set as an event (interruption) for outputting (transmitting) the output data generated by the program execution of the CPU unit 13 to other units or other devices. When the output preparation interruption (P) or the field network transmission interruption (X) occurs, the real time OS 200 switches the executing target in the microprocessor 100 from the program being executed at the time the interruption occurred to the scheduler program 212. The real time OS 200 executes the program included in the other system program 210 if the scheduler program 212 and the program which execution is controlled by the scheduler program 212 are not executed at all. Such program includes a program related to the communication processing through the connection cable 10 (USB), and the like between the CPU unit 13 and the PLC support device 8.

<D. Outline of Motion Control>

A typical configuration contained in the user program 236 described above will now be described. The user program 236 includes an instruction to periodically determine whether or not a condition to start the control related to the motion of the motor is met. For example, the logic is to determine whether or not a work to be subjected to some kind of procedure by the drive force of the motor is transported to a predetermined processing position. The user program 236 further includes an instruction to start the motion control in accordance with the determination that the condition to start the control is met. The execution of the motion instruction is instructed with the start of the motion control. The motion computation program 234 corresponding to the instructed motion instruction is activated, and the initial processing necessary to calculate the command value with respect to the motor is first executed for every execution of the motion computation program 234. In the motion control cycle same as the initial processing, the command value in the first cycle is calculated. Therefore, the initial processing and the first command value calculation processing become the processing to be performed by the activated motion computation program 234 in the first execution. Thereafter, the command value in each cycle is sequentially calculated.

Figure 4:
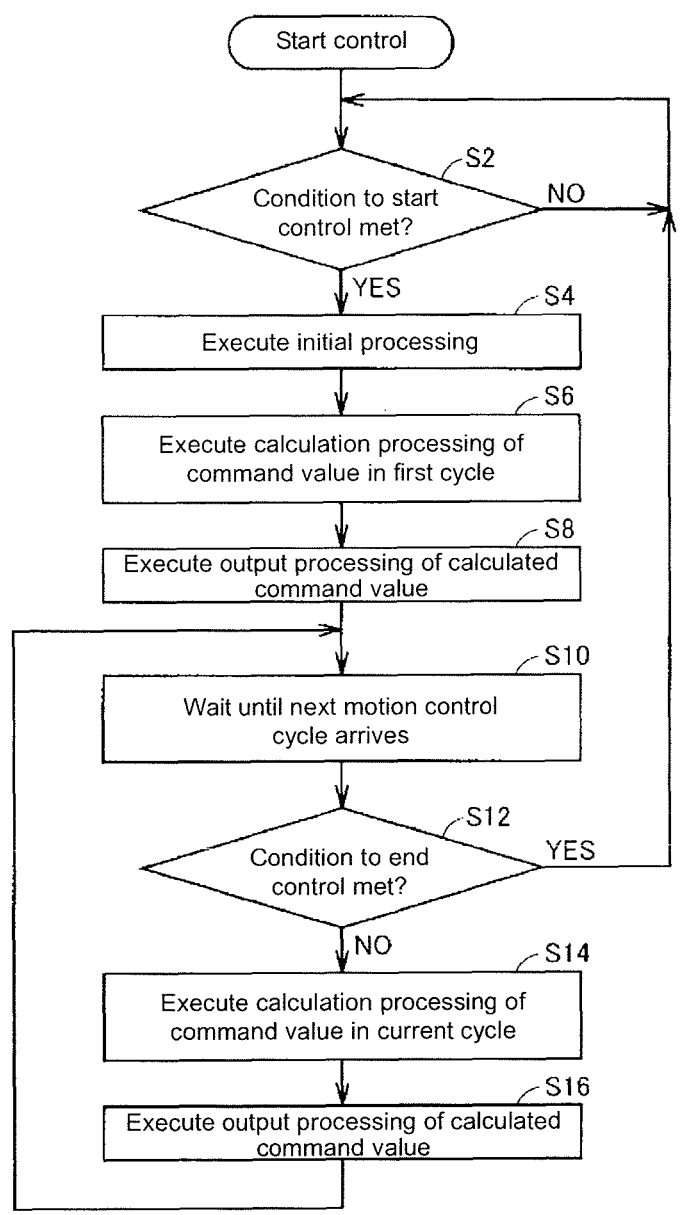
FIG. 4 is a flowchart showing a schematic processing procedure of a motion control provided by a control program.

FIG. 4 is a flowchart showing a schematic processing procedure of the motion control provided by the control program 230 (user program 236, sequence instruction computation program 232, and motion computation program 234) according to the embodiment of the present invention. With reference to FIG. 4, the microprocessor 100 periodically determines whether or not the condition to start the control related to the motion of the motor is met (step S2). The determination on whether or not the condition to start the control is met is made by the user program 236 and the sequence instruction computation program 232. If the condition to start the control is not met (NO in step S2), the determination of step S2 is repeated.

If the condition to start the control is met (YES in step S2), the microprocessor 100 executes the initial processing related to the motion control (step S4). The initial processing includes calculation processing of start position coordinate, end position coordinate, initial speed, initial acceleration, path, and the like of the motion of the motor. The microprocessor 100 then executes the calculation processing of the command value in a first cycle (step S6). Furthermore, the microprocessor 100 executes an output processing of the calculated command value (step S8).

Thereafter, the microprocessor 100 waits until the next motion control cycle arrives (step S10). The microprocessor 100 then periodically determines whether or not a condition to end the control related to the motion of the motor is met (step S12). If the condition to end the control is met, this means that the servo motor 4 has reached the end position. If the condition to end the control is met (YES in step S12), the processing of step S2 and the subsequent steps are again repeated. In this case, the motion computation program 234 being activated is maintained in the inactive state until a new condition to start the control is met.

If the condition to end the control is not met (NO in step S12), the microprocessor 100 executes the calculation processing of the command value in the current cycle (step S14). Furthermore, the microprocessor 100 executes the output processing of the calculated command value (step S16). The processing of step S10 and the subsequent steps are then repeated.

Hereinafter, the function module for realizing the motion control is also referred to as "motion control function module". Specifically, the "motion control function module" is a function module that executes the output of the command value to the shaft and the acquisition of the information from the shaft necessary for realizing the motion operation desired by the user at a constant period using the target values (position, speed, torque, etc.) given by the user program. The "motion control function module" is an open loop type controller that outputs the command value to the servo driver. The instruction (function block, etc.) that gives an instruction to the motion control function module is referred to as "motion control instruction".

Figure 5:
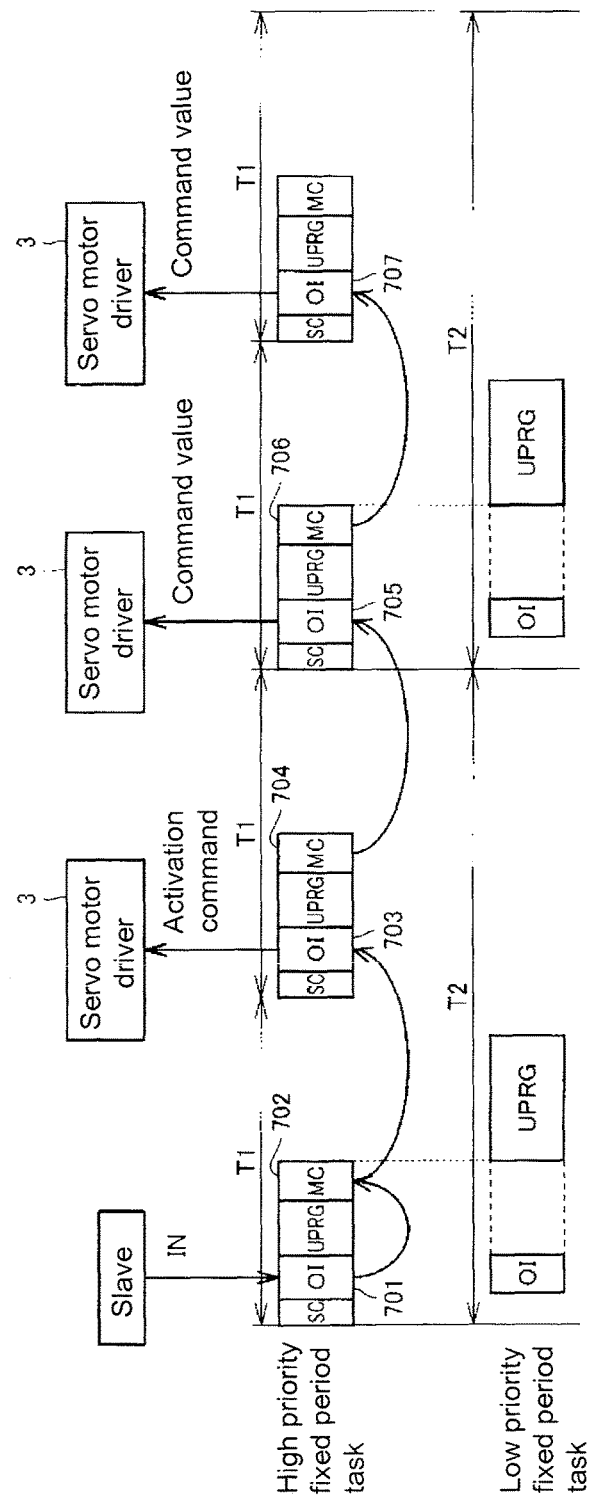
FIG. 5 is a view showing a relationship of a motion control instruction and a task.

FIG. 5 is a view showing a relationship of the motion control instruction and the task. Specifically, FIG. 5 is a view showing data flow. With reference to FIG. 5, the motion control function module is executed during a high priority fixed period task. The motion control instruction can be described in the high priority fixed period task or the low priority fixed period task. The high priority fixed period task is a task having the highest priority in the CPU unit 13.

If the high priority fixed period task becomes executable during the execution of the low priority fixed period task, the low priority fixed period task is once interrupted, and the high priority fixed period task is executed. After the high priority fixed period task is completed, the execution of the low priority fixed period task is resumed. A period T2 of the low priority fixed period task is an integral multiple of a period T1 of the high priority fixed period task. FIG. 5 shows a case of T2=2T1.

In FIG. 5, the scheduler program is noted as "SC", the output/input processing program is noted as "OI", the user program 236 is noted as "UPRG", and the motion computation program 234 is noted as "MC". Furthermore, in FIG. 5, different reference numbers 701 to 707 are denoted to identify each OI and each MC for the sake of convenience of explanation.

The order of the rough flow of data is (1) slave→OI 701→MC 702→OI 703→servo motor driver 3, (2) MC 704→OI 705→servo motor driver 3, and (3) MC 706→OI 707→servo motor driver 3. This will be specifically described below.

During the execution of the PLC 1, the microprocessor 100 is in a state of being able to execute at least the output/input processing program (output processing program 214 and input processing program 216), the user program 236, and the motion computation program 234. Strictly speaking, the real time OS 200 holds the process (or sled) related to the respective program in an executable state, and each program is executed at an appropriate timing and in an appropriate order by having the scheduler program 212 use the real time OS 200 and the hardware resource (system timer 108, etc.). Thus, start/interruption/end, and the like of the execution related to the respective program are controlled by the scheduler program 212.

In FIG. 5, the field network controller 140 (see FIG. 2) receives the motion control input data and stores the motion control input data in a field network reception buffer (not shown) of the main memory 104, and/or the PLC system bus controller 120 receives the motion control input data and stores the motion control input data in a PLC system bus reception buffer (not shown) of the main memory 104 on the basis of the input (IN) from the slave to the OI 701. The CPU unit 13 is set as the master, and the respective units other than the CPU unit 13 are set as the slave.

Activation command data or motion command value data is output in accordance with the instruction of the IO processing program 218. More specifically, the activation command data and the motion command value data stored in the work region (not shown) of the control program of the main memory 104 are transferred to a field network transmission buffer (not shown) of the main memory 104. Following the data transfer to the field network transmission buffer, the field network controller 140 transmits the activation command data or the motion command value data to the servo motor driver 3.

In the input (IN) from the slave to the OI 701, input data that is used for the computation in the user program 236 but not used for the computation in the motion computation program 234 is also input. Furthermore, even if the user program output data generated by the execution of the user program 236 is the output data that is not used for the computation in the motion computation program 234, the user program output data is transmitted to the IO processing program 218 and output in the processing of the OI.

The "motion control cycle" according to the present embodiment is the period of execution and communication of the motion computation program 234, that is, the cycle of a series of processing executed in the period of providing the motion command value data to the servo motor driver 3.

<E. Electronic Cam>

The electronic cam operation will be described hereinafter as a function of the synchronization control. The "synchronization control" refers to controlling the position of the driven shaft (control target shaft) in synchronization with the position of the main shaft (input shaft). One of the position of the encoder for the full closed loop control, the command positions of the servo driver and the virtual servo driver, as well as the feedback positions of the encoder, the servo driver, and the virtual servo driver can be specified for the main shaft. The "electronic cam operation" refers to the function of performing the CAM operation at a control period according to the CAM pattern set by the CAM table to be described later.

Since the CPU unit 13 controls the output by computing in synchronization with the input for every control period, the computation result may become greater than the highest speed that can be output with the motion control function module. In this case, however, the CPU unit 13 performs the output at the highest speed without considering it as an error. The CPU unit 13 distributes and outputs the movement amount that is lacking due to the saturation at the highest speed in the next control period and thereafter.

Figure 6:
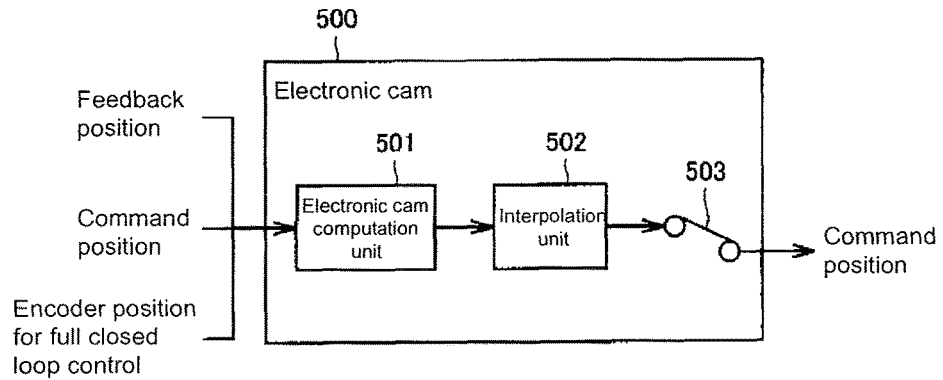
FIG. 6 is a view showing the function outline of an electronic cam.

FIG. 6 is a view showing the function outline of the electronic cam. With reference to FIG. 6, an electronic cam 500 includes an electronic cam computation unit 501, an interpolation unit 502, and a switch unit 503. The electronic cam computation unit 501 is input with a preselected position among the position of the encoder for full closed loop control, the command positions of the servo driver and the virtual servo driver, as well as the feedback positions of the encoder, the servo driver, and the virtual servo driver.

The electronic cam computation unit 501 outputs the displacement of the driven shaft to the interpolation unit 502 on the basis of the phase of the input main shaft and the CAM table. The interpolation unit 502 performs interpolation processing using the value output from the electronic cam computation unit 501. The interpolation unit 502 outputs the value (command value) after the interpolation processing through the switch unit 503. The CAM table is stored in advance in the non-volatile memory 106, and is developed in the main memory 104 with power ON.

Figure 7:
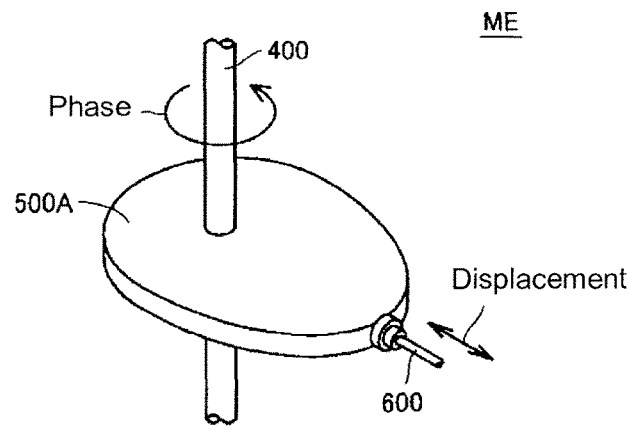
FIG. 7 is a view for visually describing the operation of the electronic cam.

FIG. 7 is a view for visually describing the operation of the electronic cam 500. Specifically, FIG. 7 is a view showing a CAM mechanism ME including a mechanical CAM 500A represented with a CAM curve based on the CAM table. With reference to FIG. 7, the CAM mechanism ME includes a main shaft 400, the mechanical CAM 500A, and a driven shaft 600. The mechanical CAM 500A is fixed to the main shaft 400, and rotates with the rotation of the main shaft 400. The driven shaft 600 performs a linear motion with the rotation of the mechanical CAM 500A. That is, in the CAM mechanism ME, the driven shaft 600 displaces (outputs) when the phase (input) of the main shaft is changed. The electronic cam 500 realizes the input/output in the CAM mechanism ME by software.

Figure 8:
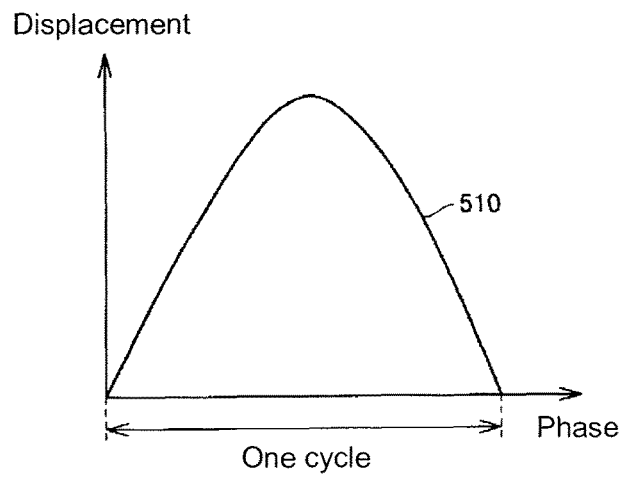
FIG. 8 is a view showing a CAM curve of the electronic cam.

FIG. 8 is a view showing a CAM curve 510 of the electronic cam 500. With reference to FIG. 8, in the CAM curve 510, the displacement increases from zero as the phase increases from zero, and the displacement reaches the peak at the phase (180 degrees) in a half cycle. Thereafter, the displacement reduces as the phase increases, and the displacement becomes zero at the phase (360 degrees) in one cycle. The CAM curve 510 is merely an illustration, and the am curve used in the PLC system SYS is not limited thereto.

Figures 9, 10:
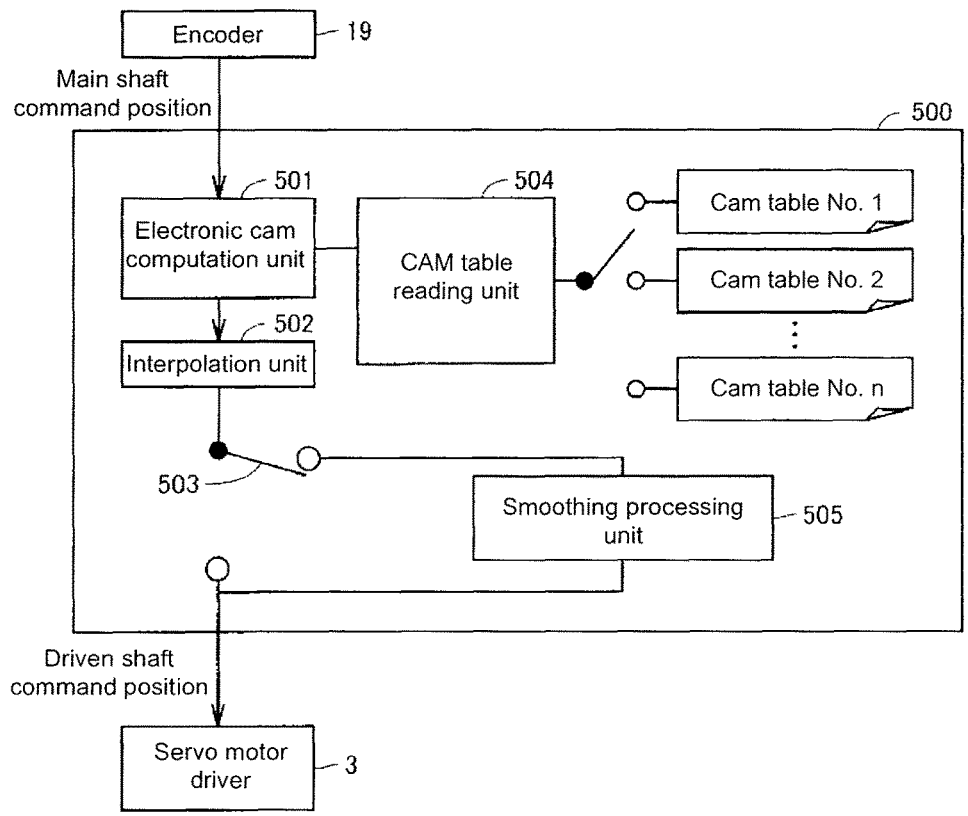
FIG. 9 is a view showing a system configuration associated with the electronic cam.
FIG. 10 is a view showing a data structure of a CAM table.

FIG. 9 is a view showing a system configuration associated with the electronic cam 500. FIG. 9 is a view that more specifically shows the electronic cam 500 of FIG. 6. With reference to FIG. 9, the system associated with the electronic cam 500 is realized by the electronic cam computation unit 501, the interpolation unit 502, the switch unit 503, a CAM table reading unit 504, a smoothing processing unit 505, and a plurality of CAM tables. FIG. 9 shows an example in which a main shaft command position (encoder position) is input from the encoder 19 to the electronic cam 500.

A relationship between a phase of the main shaft and a displacement of the driven shaft is defined in each of the plurality of CAM tables, the details of which will be described later. In the CPU unit 13, the user can specify the desired CAM table at the start of the electronic cam operation. The microprocessor 100 selects the CAM table to use from the plurality of CAM tables based on the instruction from the user. When the microprocessor 100 receives an instruction to start the electronic cam operation, the CAM table reading unit 504 reads the phase of the main shaft and the displacement of the driven shaft. The microprocessor 100 acquires the phase of the main shaft for every control period during the operation of the electronic cam, and commands the position of the driven shaft so as to become the displacement defined in the CAM table.

The electronic cam 500 can execute the smoothing processing, to be described later, with the smoothing processing unit 505. In the CPU unit 13, whether or not to perform the smoothing processing can be selected by the switch unit 503. The electronic cam 500 outputs a driven shaft command position to the servo motor driver 3. When performing the smoothing processing, the output of after performing the smoothing processing on the output from the interpolation unit 502 becomes a driven shaft command position. When not performing the smoothing processing, the output from the interpolation unit becomes the driven shaft command position.

Furthermore, user can input an instruction to change the CAM table while the driven shaft is stopped and while the electronic cam is operating, the details of which will be described later.

FIG. 10 is a view showing a data structure of the CAM table 520. More specifically, FIG. 10 is a view showing the data structure of the CAM table created by the CAM table editing software stored in the PLC support device 8.

With reference to FIG. 10, the CAM table 520 is data in which the displacement of the subordination of the electronic cam is associated with each phase of the main shaft of the electronic cam. That is, the CAM table 520 is discrete data. When linear interpolation is performed using the data in the CAM table 520, the CAM curve 510 shown in FIG. 8 is obtained. The linear interpolation is carried out by the interpolation unit 502 of FIG. 6.

In the CAM table 520, the phases from 0 degree to 360 degree can be described by dividing into maximum number of CAM data. In the CAM table 520, the phase is described by 0.1 degree. The "CAM data" is the data configured by one displacement and one phase. That is, the CAM table 520 includes a plurality of CAM data. The unit of the displacement δ is, for example, "mm".

Furthermore, the first CAM data in which the respective values of the phase and the displacement are zero in the CAM table is the starting point of the CAM table. This area is assumed as index No. 0. The CAM data one before (i.e., one above) the area where the respective values of the phase and the displacement becomes zero the next time is the terminating point of the CAM table. That is, the significant CAM data is from the starting point of the CAM table to the terminating point of the CAM table (data in a phase range of 0 degree to 360 degrees). The "significant CAM data" is the CAM data that influences the operation of the electronic cam. The number of the index, which is the identifier of the CAM data, is given to the significant CAM data. The number of the index is given in ascending order in the CAM table.

The CAM data after (i.e., below) the terminating point of the CAM table is the CAM data that does not influence the operation of the electronic cam (i.e., non-significant CAM data). Both the phase and the displacement do not need to be zero in the non-significant CAM data. The number of non-significant CAM data is specified by the CAM table editing software.

Figure 11:
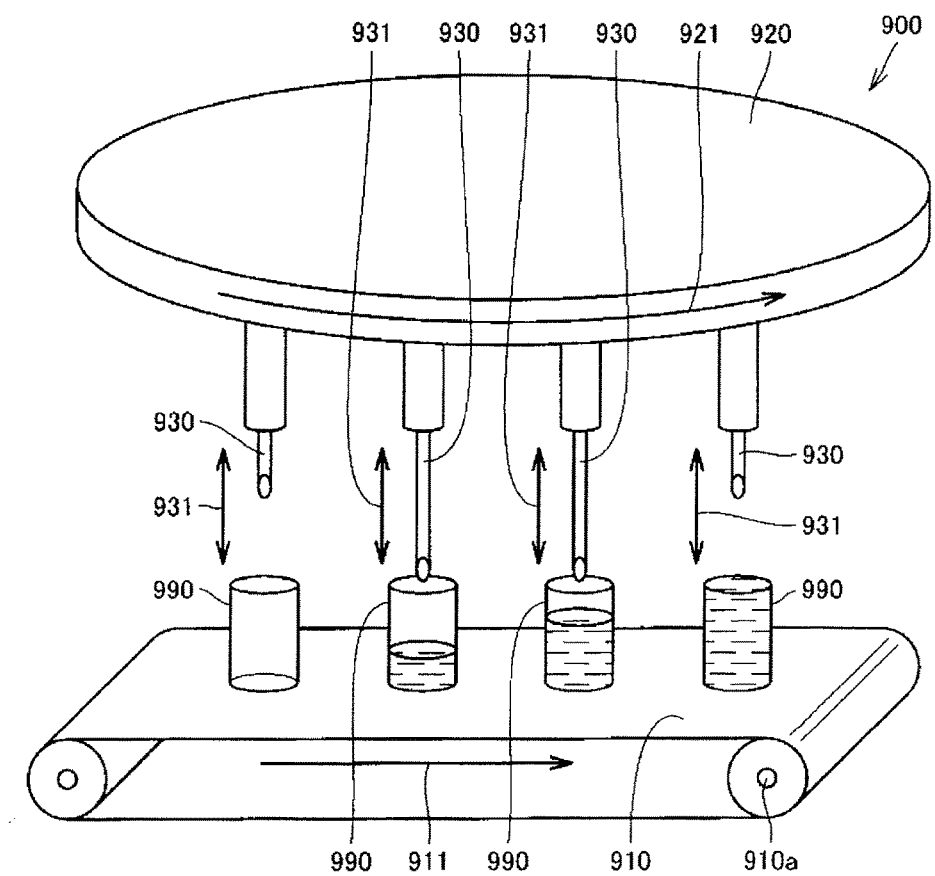
FIG. 11 is a view showing an example of a liquid filling device, to which the electronic cam is applied.

FIG. 11 is a view showing an example of a liquid filling device 900, to which the electronic cam 500 is applied. With reference to FIG. 11, the liquid filling device 900 includes a conveyor 910 for transporting a plurality of containers 990 in a direction of an arrow 911, an injection tube 930 for injecting liquid, and a turn table 920 for rotating the injection tube 930 along an arrow 921. The injection tube 930 performs a stroke movement in a direction indicated by an arrow 931 by the electronic cam with the rotation of the turn table 920. That is, in the liquid filling device 900, a shaft 910a for causing the movement in the direction of the arrow 911 corresponds to the main shaft, and the injection tube 930 corresponds to the driven shaft for performing the CAM operation synchronized with the main shaft.

Figure 12:
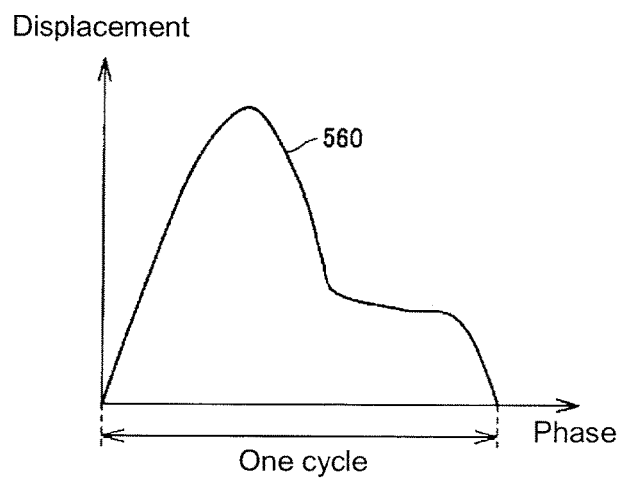
FIG. 12 is a view showing a CAM curve different from the CAM curve shown in FIG. 8.

FIG. 12 is a view showing a CAM curve 560 different from the CAM curve 510 shown in FIG. 8. With reference to FIG. 12, in the CAM curve 560, the displacement increases from zero as the phase increases from zero, and the displacement reaches the peak at around the phase of 140 degrees. Thereafter, the displacement reduces as the phase increases, and then changes so as to increase at around the phase of 290 degrees. Furthermore, the phase changes so as to decrease at around the phase of 310 degrees, and the displacement becomes zero at the phase (360 degrees) in one cycle. The CAM curve 560 is a curve different from the CAM curve 510. The CAM curve 560 is illustrative, and merely needs to be a curve different from the CAM curve 510.

FIG. 13 is a view showing a CAM table 570. With reference to FIG. 13, the CAM table 570 is data in which the displacement of the subordination of the electronic cam is associated with each phase of the main shaft of the electronic cam. That is, the CAM table 570 is discrete data, similar to the CAM table 520. When linear interpolation is performed using the data in the CAM table 570, the CAM curve 560 shown in FIG. 12 is obtained. The linear interpolation is performed by the interpolation unit 502 of FIG. 6.

As described above, the CAM table 520 and the CAM table 570 are stored in advance in the non-volatile memory, and are developed in the main memory 104 with the turning ON of power.

FIG. 14 is a view describing a switching processing of the CAM table. Specifically, FIG. 14 is a view describing the processing in which the CPU unit 13 switches the CAM table used in the CAM operation from the CAM table 520 to the CAM table 570 while the CPU unit 13 is performing the processing based on the CAM table 520.

FIG. 14A is a view showing the CAM curve 510 based on the pre-switching CAM table 520 and the CAM curve 560 based on the post-switching CAM table 570. FIG. 14B is a view describing the operation of the electronic cam at before and after the switching of the CAM table.

With reference to FIG. 14A, the displacement of the phase a in the CAM curve 510 is δ1, and the displacement of the phase θa in the CAM curve 560 is δ2 (δ2>δ1).

With reference to FIG. 14B, when receiving the command to switch the CAM table from the CAM table 520 to the CAM table 570 at the time point associated with the phase θa, the CPU unit 13 starts the processing using the CAM table 570 in the control period even if such control period in which the CAM table 520 is used is not finished. More specifically, when receiving the command to switch the CAM table at the time point associated with the phase θa of the CAM curve 510, the CPU unit 13 continues the CAM operation from the phase θb (θb>θa), which is in the vicinity of the phase θa of the CAM curve 560. Specifically, when switching the CAM table from the CAM table 520 to the CAM table 570, the CPU unit 13 starts the control using the CAM table 570 from the phase in the CAM table 570 at the time of the switching so as to have continuity with the phase in the CAM table 520 at the time of the switching.

Therefore, in the switching shown in FIG. 14B, the value of the displacement δ, which is the command value, drastically changes from δ1 to δ2 at the time point of the phase θa in the control period (middle period of FIG. 14B) in which the switching of the CAM table is performed.

Figure 15:
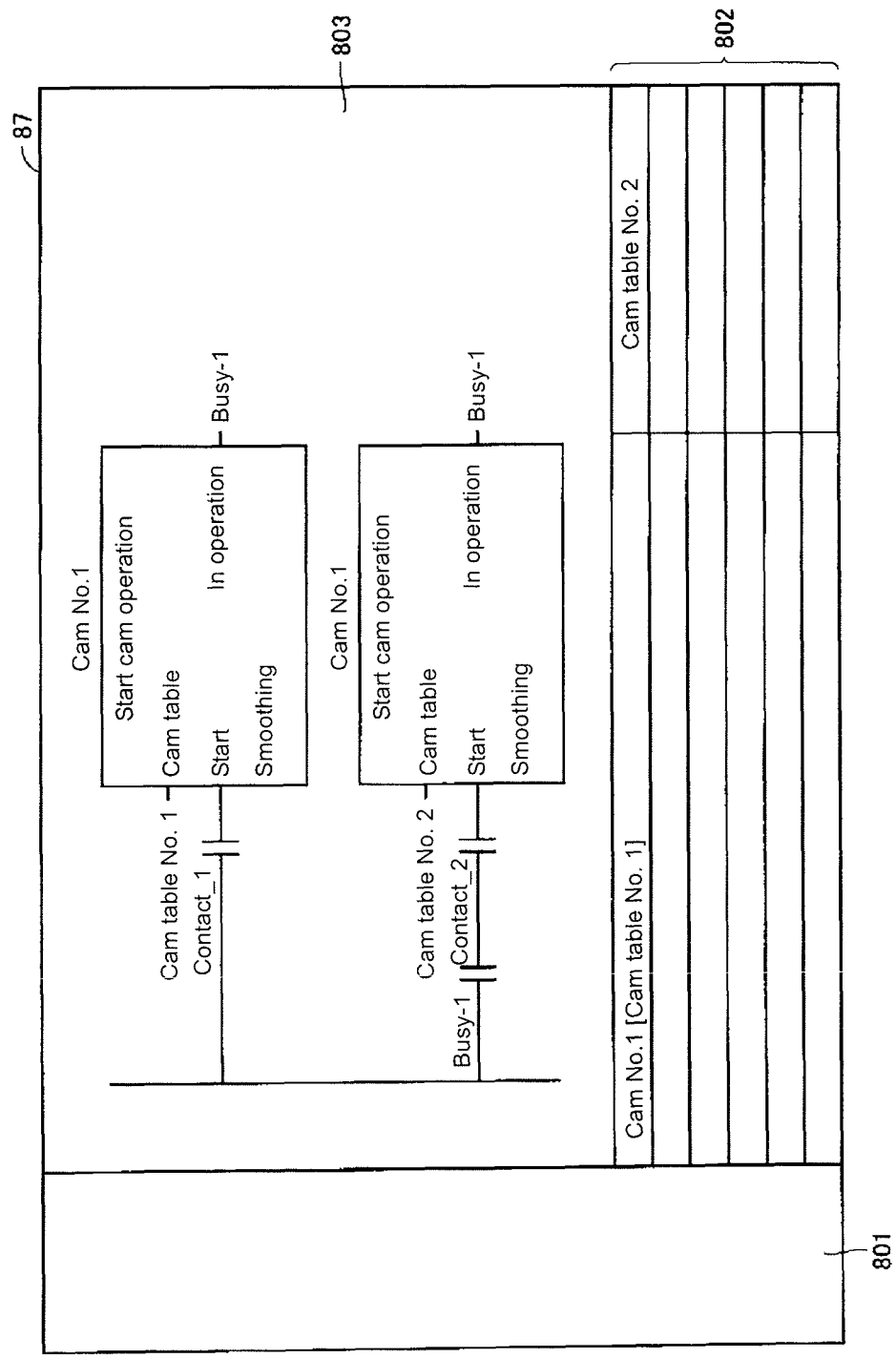
FIG. 15 is a view showing a user interface for switching the CAM tables.

FIG. 15 is a view showing a user interface for switching the CAM table. FIG. 15 shows a description example of a switching instruction of when the ladder language and the function block generally used in the PLC controller are used.

With reference to FIG. 15, the switching of the CAM table is carried out using the PLC support device 8. Specifically, when the user makes an input to instruct the switching of the CAM table while referencing the display 87 of the PLC support device 8, the switching of the CAM table developed in the main memory 104 is executed.

The display 87 displays three regions 801 to 803. The region 801 is a menu region in which selectable items are displayed. The region 802 is a region to which the user makes the input. The user describes the command to switch the CAM table used in the electronic cam No. 1 among the plurality of electronic cams from the CAM table No. 1 to the CAM table No. 2 in the region 802. For example, the CAM table 520 is associated with the CAM table No. 1, and the CAM table 570 is associated with the CAM table No. 2. The region 803 displays the processing content to be executed according to the description in the region 802.

The microprocessor 100 describes two instances "CAM No. 1" of the start of the CAM operation during the ladder program. The microprocessor 100 specifies the "CAM table No. 1" in the first instance, and specifies the "CAM table No. 2" in the second instance. The microprocessor 100 switches the CAM table to use from the CAM table 1 to the CAM table No. 2 by executing the second instance during the operation of the first instance and when the contact_2 is TRUE.

The ST (Structure Text) language may be used for the switching instruction of the CAM table instead of the ladder language.

Figure 16:
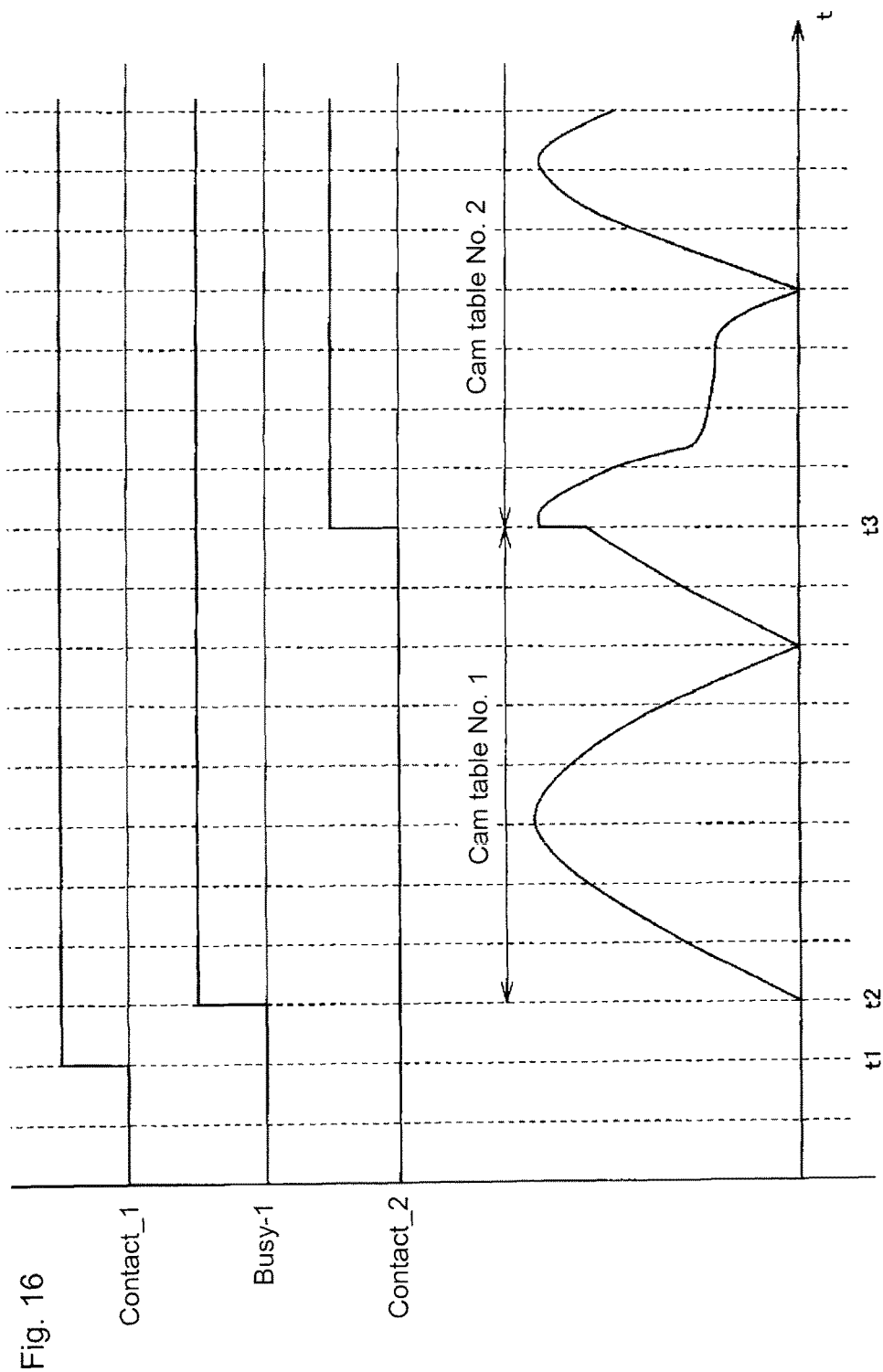
FIG. 16 is a view showing a timing chart of the switching of the CAM table shown in FIG. 15.

FIG. 16 is a view showing a timing chart of the switching of the CAM table shown in FIG. 15. With reference to FIG. 16, the contact_1 becomes TRUE at time t1, and the CPU unit 13 starts the motion control using the CAM table No. 1 at time t2 (t1<t2). At time t3 (t2<t3), the contact_2 becomes TRUE. When the contact_2 becomes TRUE, the control content switches from the motion control using the CAM table No. 1 to the motion control using the CAM table No. 2.

When the user gives a switching instruction of the CAM table during the electronic cam operation, the CAM table reading unit 504 reads the new CAM table, compares the position p(t) (i.e., displacement) of the main shaft at the time point the switching instruction of the CAM table is received and the position of the main shaft defined in the new CAM table, and continues the CAM operation from the position greater than p(t).

For example, the values of the phases match in the CAM table 520 and the CAM table 570. In this case, for example, when the switching instruction is input at the phase θa of the CAM table 520 as shown in FIG. 14 (when the contact_2 becomes TRUE in FIG. 16), the microprocessor 100 executes a motion computation program 234 using the displacement associated with the phase of the CAM table 570 greater than the phase θa. For example, the microprocessor 100 executes the motion computation program 234 using the displacement associated with the phase (θa+0.1°) after the phase θa in the CAM table 570. Thereafter, the microprocessor 100 performs the processing based on the ascending order of the phases with the phase (θa+0.1) as the starting point.

Figure 17:
FIG. 17 is a view describing the processing at the time of the switching of the CAM table.

FIG. 17 is a view describing the processing at the time of the switching of the CAM table. With reference to FIG. 17, it is assumed that the phase of the main shaft at the time of the switching instruction of the CAM table is 200° when changing the CAM table from the CAM table No. i (not shown) currently being used to the CAM table No. j. Furthermore, it is assumed that the phase of the CAM table No. j is 210° after 180°. Here, i and j are natural numbers.

In this case, the CPU unit 13 outputs the command value to the apparatus to be controlled so that the displacement (position) of the apparatus to be controlled, which is the driven shaft, becomes 100 mm associated with the phase of 210°, which is greater than 200°.

If the user specifies the use of the smoothing function, to be described later, at the time of the switching the CAM table, the smoothing processing unit 505 performs the processing of smoothly changing the driven shaft command position to suppress the drastic change in the driven shaft command position that occurs at the time of the switching of the CAM table. The servo driver of the driven shaft thus can be prevented from hunching. That is, the generation of vibration of the driven shaft can be reduced at the time of the switching of the CAM table.

Figure 18:
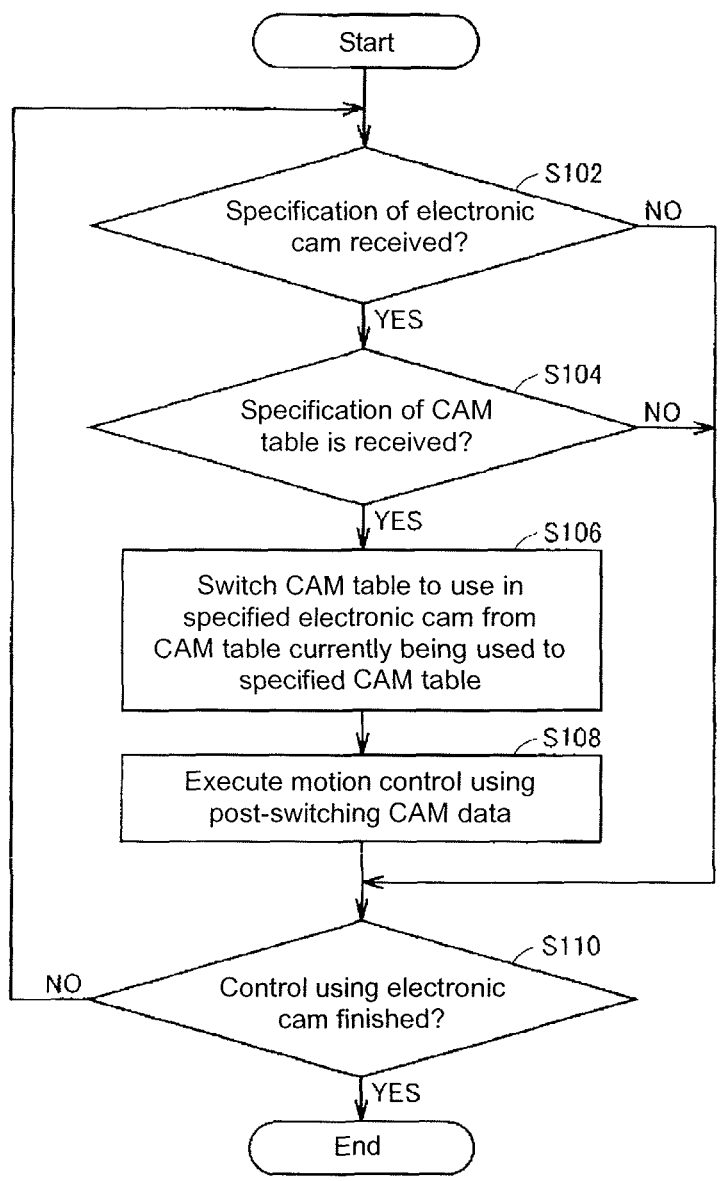
FIG. 18 is a flowchart showing a procedure for switching the CAM tables.

FIG. 18 is a flowchart showing a procedure for switching the CAM table. With reference to FIG. 18, the microprocessor 100 determines whether or not a specification of the electronic cam to switch the CAM table is received from the plurality of electronic cams in step S102.

When determining that the specification is not received (NO in step S102), the microprocessor 100 proceeds the processing to step S110. When determining that the specification is received (YES in step S102), the microprocessor 100 determines whether or not the specification of the CAM table to use after the switching is received in step S104.

When determining that the specification of the CAM table is not received (NO in step S104), the microprocessor 100 proceeds the processing to step S110. When determining that the specification of the CAM table is received (YES in step S104), the microprocessor 100 switches the CAM table to use in the specified electronic cam (e.g., electronic cam No.

1) from the CAM table (e.g., table 520) currently being used to the specified CAM table (e.g., CAM table 570) in step S106.

In step S108, the microprocessor 100 executes the motion control using the post-switching CAM table. In step S110, the microprocessor 100 determines whether or not the control using the specified electronic cam is finished. When determining that the control is finished (YES in step S108), the microprocessor 100 terminates the series of processing. When determining that the control is not finished (NO in step S108), the microprocessor 100 proceeds the processing to step S102.

The control instruction to switch the CAM table may be such that the control instruction to switch the CAM table is described in the high priority fixed period task or the control instruction is described in the low priority fixed period task.

Figure 19:
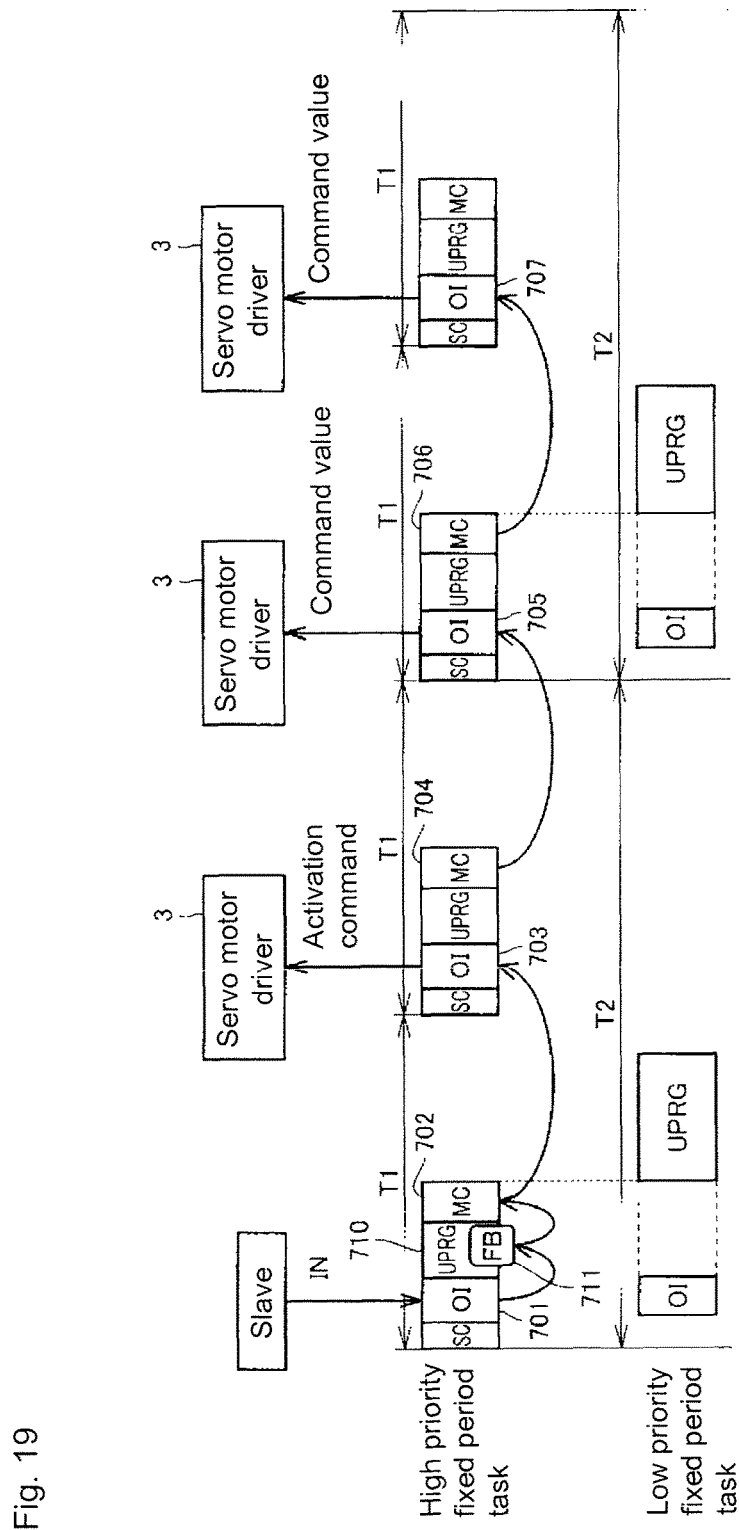
FIG. 19 is a view showing a data flow of when a control instruction to switch the CAM tables is described in a high priority fixed period task.

FIG. 19 is a view showing a data flow of when the control instruction to switch the CAM table is described in the high priority fixed period task. With reference to FIG. 19, the control instruction FB (Function Block) 711 to switch the CAM table is described in the UPRG 710. The order of the rough flow of data in this case is (1) slave→OI 701→FB 711→MC 702→OI 703→servo motor driver 3, (2) MC 704→OI 705→servo motor driver 3, (3) MC 706→OI 707→servo motor driver 3.

Figure 20:
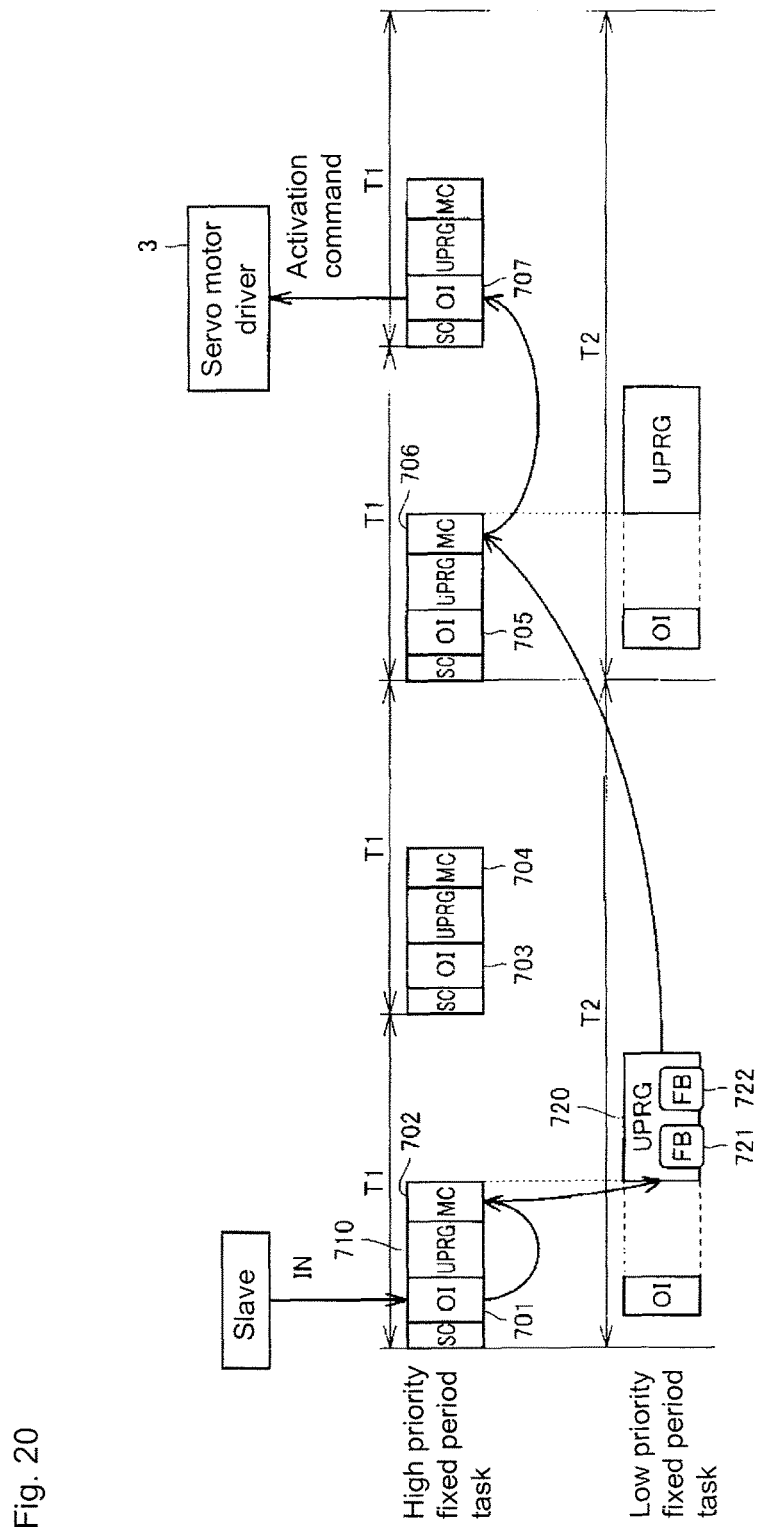
FIG. 20 is a view showing a data flow of when the control instruction to switch the CAM tables is described in a low priority fixed period task.

FIG. 20 is a view showing a data flow of when the control instruction to switch the CAM table is described in the low priority fixed period task. With reference to FIG. 20, the control instruction FB (Function Block) 721, 722 to switch the CAM table are described in the UPRG 720. The order of the rough flow of data in this case is slave→OI 701→MC 702→UPRG 720 (FB 721, 722)→OI 706→OI 707→servo motor driver 3.

(Variant)

In FIG. 14B, the value of the displacement δ, which is the command value, drastically changes from δ1 to δ2 at the time point of phase θa in the period in which the switching of the CAM table is performed, as described above. Such drastic change is not preferable. When the computation result by the CPU unit 13 in the vicinity of the phase θa is greater than the maximum acceleration, maximum deceleration, and/or maximum surge that can be output by the motion control function module, the control following the drastic change in displacement shown in FIG. 14B cannot be performed. Due to such reasons, the control using the CAM table obtained by performing the smoothing processing on the data of the CAM table 570 is preferably carried out in the control period in which the switching of the CAM table is performed. Hereinafter, the CAM table obtained by performing the smoothing processing on the data of the CAM table 570 is referred to as "CAM table 570A" for the sake of convenience of the explanation. The CAM curve based on the CAM table 570A is referred to as "CAM curve 560A".

Figure 21:
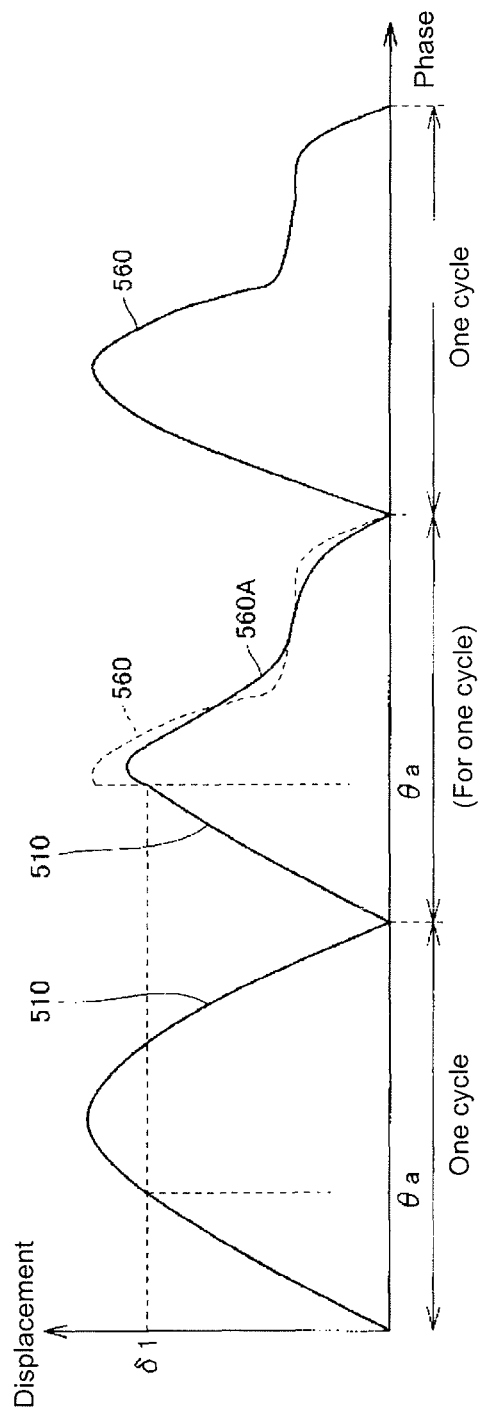
FIG. 21 is a view describing the operation of the electronic cam at before and after the switching of the CAM table.

FIG. 21 is a view describing the operation of the electronic cam at before and after the switching of the CAM table. Specifically, FIG. 21 is a view describing the operation of the electronic cam of when the CPU unit 13 switches the CAM table to use in the CAM operation from the CAM table 520 to the CAM table 570 while the CPU unit 13 is performing the processing based on the CAM table 520.

With reference to FIG. 21, when receiving the command to switch from the CAM table 520 to the CAM table 570, the microprocessor 100 executes the processing using the CAM table 570A instead of the CAM table 570 in the control period in which the switching command is received. The microprocessor 100 executes the processing using the CAM table 570 instead of the CAM table 570A in the next control period if the CAM table 570A is used once.

Thus, the CPU unit 13 uses the smoothed CAM table in the control period in which the instruction to switch the CAM table is received, so that the occurrence of drastic change in displacement is reduced.

The smoothing processing described above is realized by having the microprocessor 100 use a smoothing filter stored in advance in the non-volatile memory. The smoothing filter preferably has a low pass property to smooth the drastic change. A typical smoothing filter having the low pass property is, for example, first-order lag filter, high-order lag filter, and moving average filter.

Figure 22:
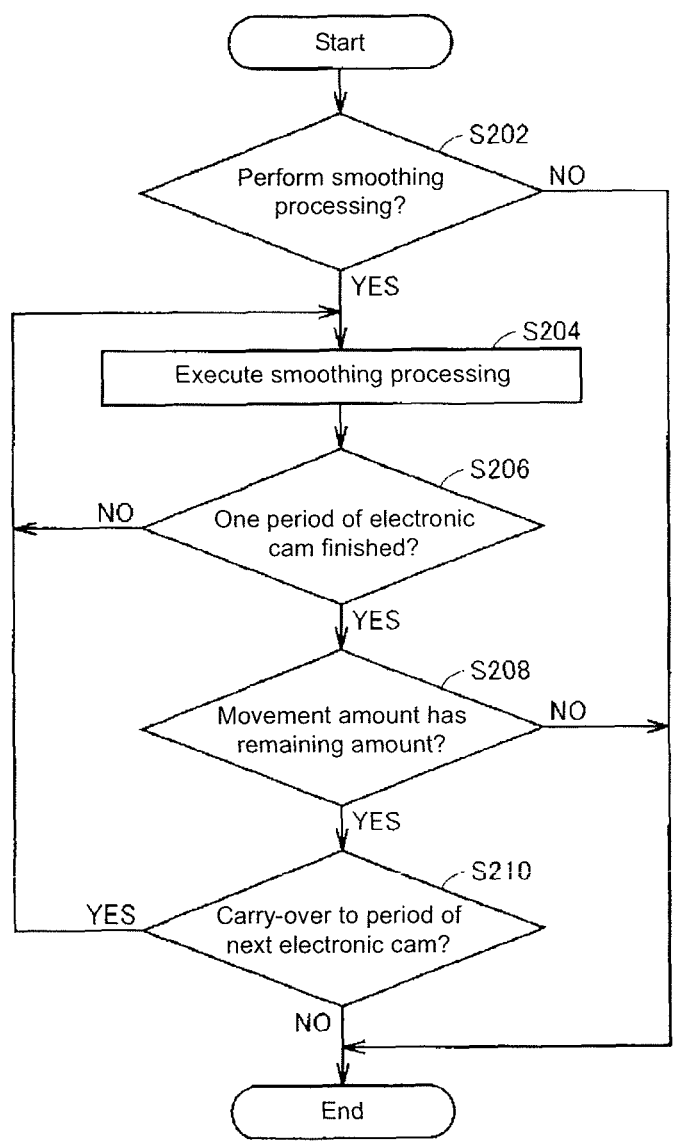
FIG. 22 is a flowchart showing a flow of processing related to the smoothing processing.

FIG. 22 is a flowchart showing a flow of processing related to the smoothing processing. The processings shown in the flowchart are executed in step S108 of FIG. 18.

With reference to FIG. 22, the microprocessor 100 determines whether or not to execute the smoothing processing in step S202. The method of determination will be described later (FIG. 23). When determining to execute the smoothing processing (YES in step S202), the microprocessor 100 performs the smoothing processing in step S204. When determining not to execute the smoothing processing (NO in step S202), the microprocessor 100 terminates the series of processing.

In step S206, the microprocessor 100 determines whether or not one period of the electronic cam (also referred to as "CAM period") is finished. That is, the microprocessor 100 determines whether or not the period including the time of the switching of the CAM table is finished. When determining that the period is finished (YES in step S206), the microprocessor 100 determines whether or not the movement amount has remaining amount in step S208. When determining that the period is not finished (NO in step S206), the microprocessor 100 proceeds the processing to step S204.

When determining that the movement amount has remaining amount (YES in step S208), the microprocessor 100 determines whether or not to perform a carry-over processing to compensate for the lack of movement amount in the period of the next electronic cam. The method of determination will be described later (FIG. 23). When determining to perform the carry-over processing (YES in step S210), the microprocessor 100 proceeds the processing to step S204. When determining not to perform the carry-over processing (NO in step S210), the microprocessor 100 stops the execution of the smoothing processing. That is, the microprocessor does not perform the smoothing processing in the period of the next electronic cam.

The smoothing processing unit 505 may use the first-order lag filter in which a transfer function G(s) becomes the following equation (1), for example, when performing the smoothing processing described above.

$$G(s)=1/(T \times s+1) \tag{1}$$

"T" in equation (1) is a time constant. The smoothing is more smoothly carried out, the larger the value of "T". The low pass filter generally has a property in that the phase of the signal lags. The lag extent of the phase and the smoothness are in a trade-off relationship. If the lag in phase is eliminated after the switching of the CAM table, "T" needs to be set small.

Figure 26:
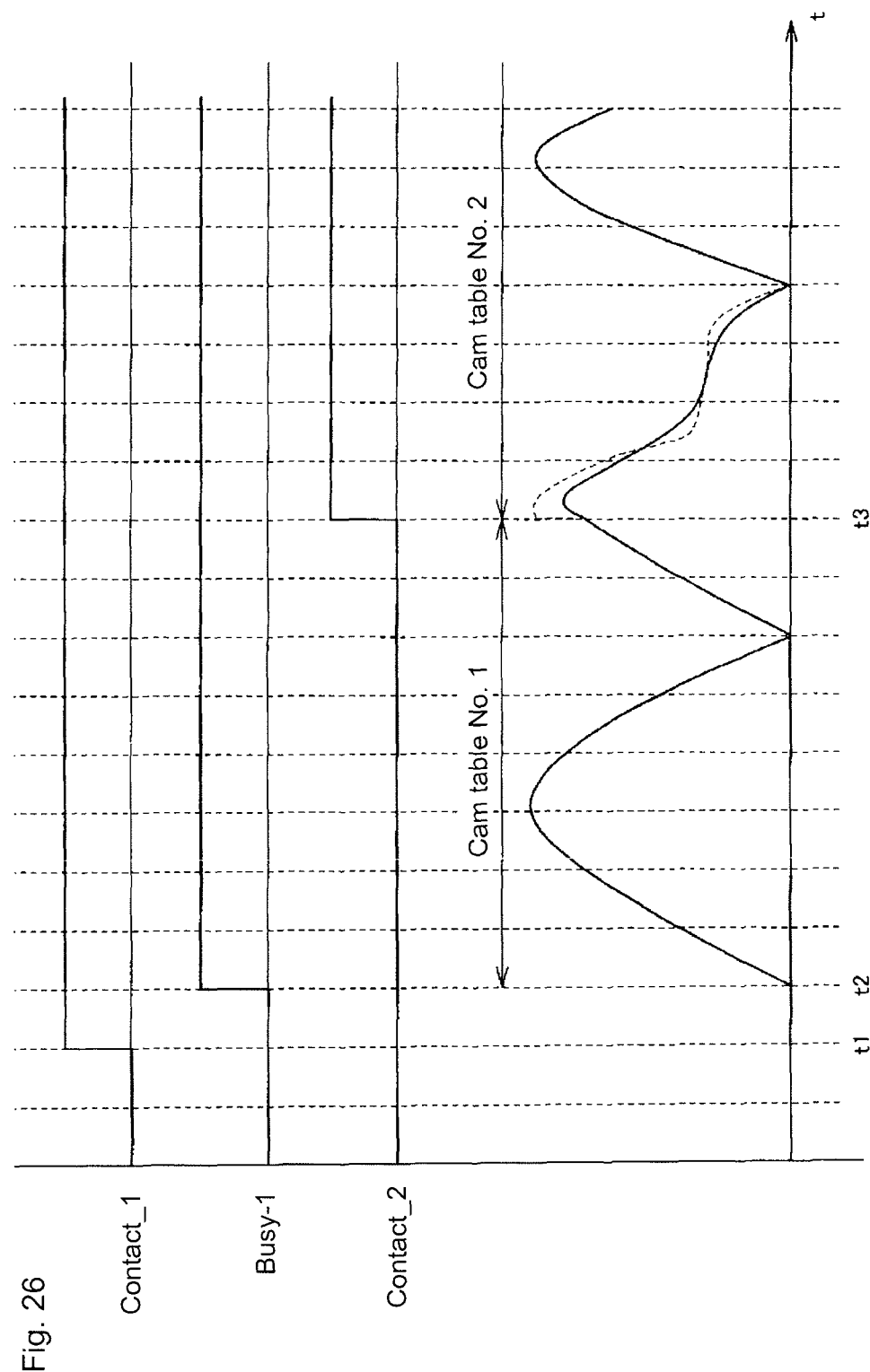
FIG. 26 is a view showing a timing chart of the switching of the CAM table shown in FIG. 15 when a smoothing filter is used.

FIG. 26 is a view showing a timing chart of the switching of the CAM table shown in FIG. 15 when the smoothing filter is used. With reference to FIG. 26, the contact_1 becomes TRUE at time t1 and the CPU unit 13 starts the motion control using the CAM table No. 1 at time t2 (t1<t2).

At time t3 (t2<t3), the contact_2 becomes TRUE. When the contact_2 becomes TRUE, the control content switches from the motion control using the CAM table No. 1 to the motion control using the CAM table No. 2 and the smoothing filter.

A case of performing the control using the CAM table obtained by performing the smoothing processing on the data of the CAM table 570 has been described above, but this is not the sole case. When switching the CAM curve, a switching interval for connecting both curves may be provided, and the CPU unit 13 may be configured to perform smooth switching without generating a discontinuous driven shaft position command by connecting the curves with a polynomial equation curve.

Figure 27:
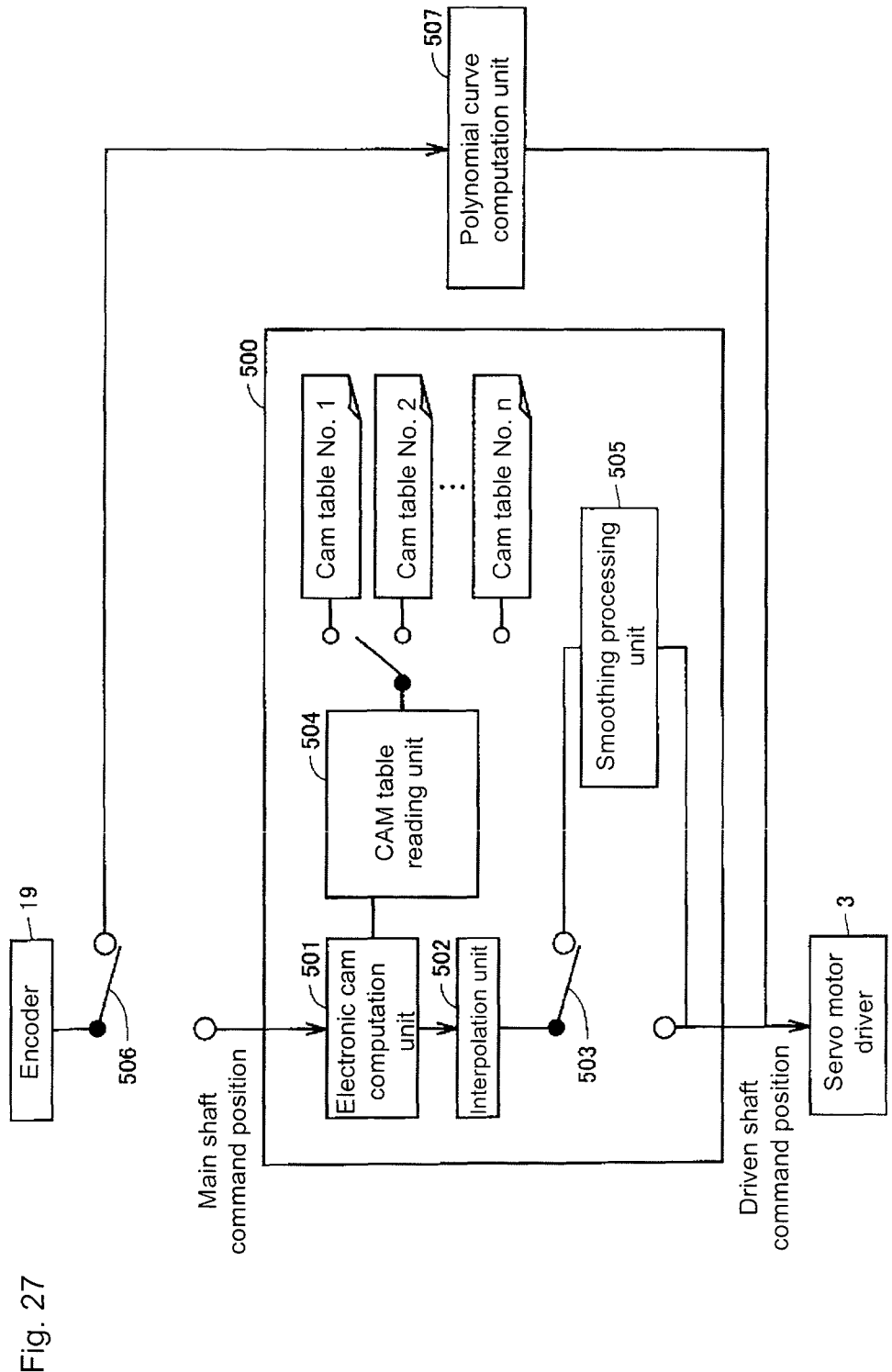
FIG. 27 is a view showing a system configuration related to the electronic cam 500 in a case of using a polynomial equation curve.

FIG. 27 is a view showing a system configuration related to the electronic cam 500 in a case of using a polynomial equation curve. With reference to FIG. 27, the system related to the electronic cam 500 is realized by the electronic cam computation unit 501, the interpolation unit 502, the switch unit 503, the CAM table reading unit 504, the smoothing processing unit 505, a plurality of CAM tables, a switch unit 506, and a polynomial curve computation unit 507. FIG. 27 shows an example in which a main shaft command position (encoder position) is input from the encoder 19 to the electronic cam 500, similarly to FIG. 9.

The switch unit 506 is a circuit for switching between the electronic cam computing function and the polynomial curve computing function. The CPU unit 13 performs the following processing.

First, the system (CPU unit 13) related to the electronic cam 500 connects the switch unit 506 to the electronic cam computation unit 501 before the switching of the CAM table. The system related to the electronic cam 500 connects the switch unit 506 to the polynomial curve computation unit 507 when receiving an instruction to switch the CAM table. The system related to the electronic cam 500 then sets the main shaft distance (phase width) of the switching interval, and assumes the main shaft distance as $\Delta P$. The system related to the electronic cam 500 reconnects the switch unit 506 to the electronic cam computation unit 501 when the main shaft position changes by greater than or equal to $\Delta P$ from the switching start position.

Hereinafter, an example in which the driven shaft command computation in the B-SPLINE $5^{th}$ order is performed according to the equation of B-SPLINE described in the document "CAM Design and Manufacturing Handbook Second Edition" (written by Robert L. Norton, INDUSTRIAL PRESS INC 2009) is shown.

(i) The electronic cam 500 assumes the main shaft position, the driven shaft displacement, the driven shaft speed, and the driven shaft acceleration at the time of the switching as P1, S1, V1, and A1.

(ii) The electronic cam 500 obtains the displacements of the driven shaft displacement, the driven shaft speed, and the driven shaft acceleration when the post-switching CAM curve is at the main shaft position (P1+$\Delta P$), and assumes the respective displacements as S2, V2, and A2.

(iii) The electronic cam 500 assumes the polynomial equation curve when the main shaft position is P and the driven shaft command position is S as the following equation (2).

$$S(P)=C1+C2\times P+C3\times P\hat{}2+C4\times P\hat{}3+C5\times P\hat{}4+C6\times P\hat{}5 \quad (2)$$

Here, C1 to C5 are coefficients that satisfy the following boundary conditions. "^" (hut mark) is an operator that indicates power-law calculation.

$$S(P1)=S1$$

$$S'(P1)=V1$$

$$S''(P1)=A1$$

$$S(P2)=S2$$

$$S'(P2)=V2$$

$$S''(P2)=A2$$

Here, "'" is an operator that represents differentiation.

(iv) The electronic cam 500 computes the driven shaft command position in the switching interval using equation (2).

Figure 28:
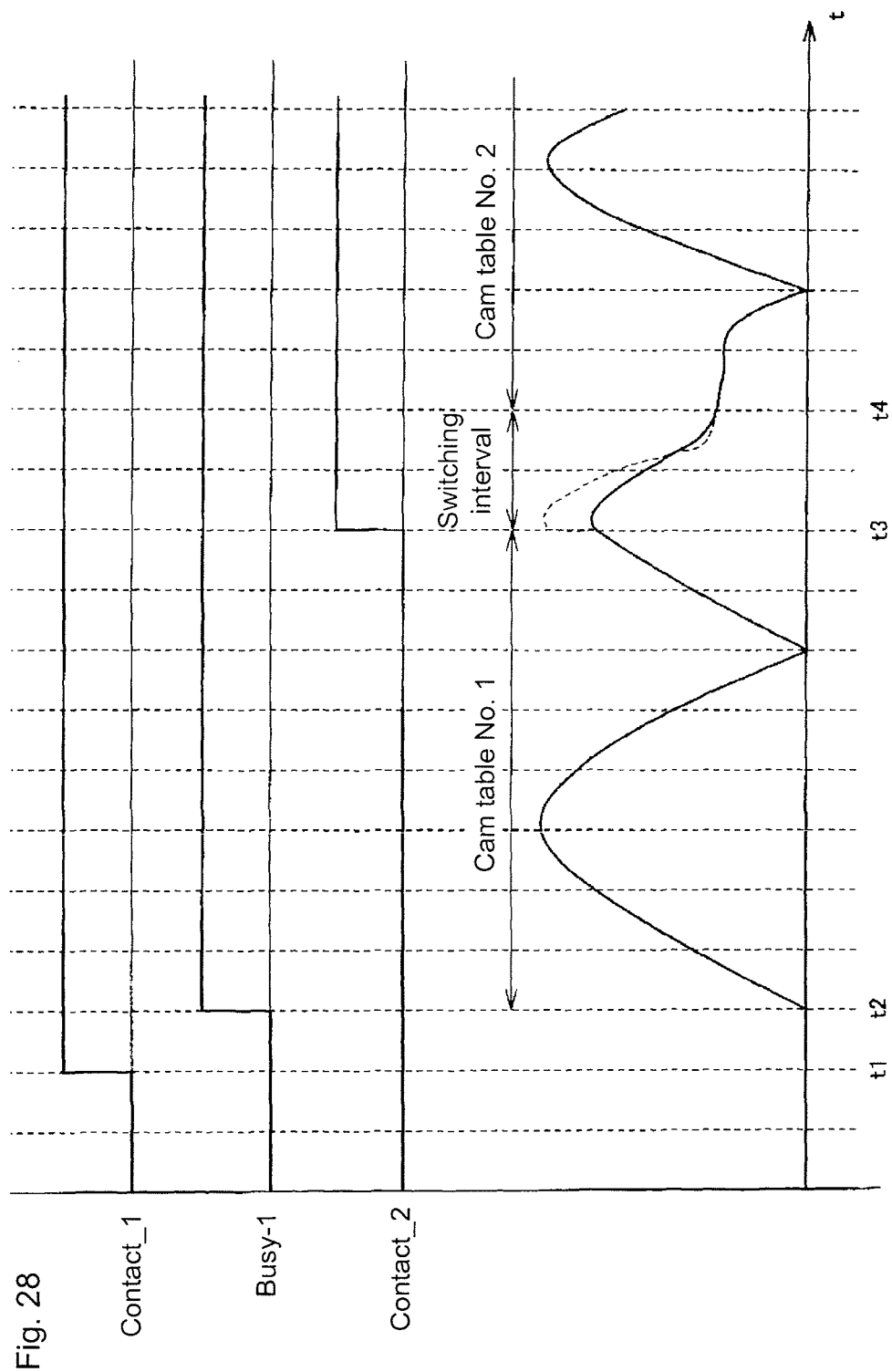
FIG. 28 is a view showing a timing chart of the switching of the CAM table shown in FIG. 15 when a polynomial equation is used.

FIG. 28 is a view showing a timing chart of the switching of the CAM table shown in FIG. 15 when a polynomial equation is used. With reference to FIG. 28, the contact 1 becomes TRUE at time t1, and the CPU unit 13 starts the motion control using the CAM table No. 1 at time t2 (t1<t2). At time t3 (t2<t3), the contact_2 becomes TRUE. When the contact 2 becomes TRUE, the CPU unit 13 performs the smoothing processing using the polynomial equation. The CPU unit 13 switches the control content from the motion control using the CAM table No. 1 to the motion control using the CAM table No. 2 after elapse of the switching interval (t3 to t4).

FIG. 23 is a view describing a smoothing pattern of when performing the smoothing processing. When the user specifies the smoothing processing method at the time of the switching of the CAM table, the instruction of the function block method described above is used, for example. Specifically, the user adds an input variable "CamTransition" for specifying the smoothing pattern to the instruction "MC_CamIn". The "CamTransition" is, for example, an enumerator type and specifies one of the smoothing patterns shown in FIG. 23.

When the enumerator is "_mcCTNone", the microprocessor 100 does not perform the smoothing processing. When the enumerator is "_mcCTMaxAccDec", the microprocessor 100 suppresses at the maximum acceleration. In this case, the microprocessor 100 outputs an error if the smoothing processing is not finished in one period of the cam. When the enumerator is "_mcCTMaxAccDecCyclic", the microprocessor 100 suppresses at the maximum acceleration. In this case, the microprocessor 100 processes the lacking amount (i.e., remaining amount) in the next cycle if the smoothing processing is not finished in one period of the cam. That is, the CPU unit 13 performs the carry-over processing.

When the enumerator is "_mcCTFiltering", the microprocessor 100 uses the smoothing filter. In this case, the microprocessor 100 outputs an error if the smoothing processing is not finished in one period of the cam. When the enumerator is "_mcCTFilteringCyclic", the microprocessor 100 uses the smoothing filter. In this case, the microprocessor 100 processes the lacking amount in the next cycle if the smoothing processing is not finished in one period of the cam.

When the enumerator is "_mcCTPoly5", the microprocessor 100 performs the interpolation processing with the fifth-order polynomial equation. The fifth-order polynomial equation is given by way of example, but the microprocessor 100 may be configured to perform the interpolation processing with the third or higher order polynomial equation.

<F. Summary of CPU Unit>

(1) The CPU unit 13 is a computation unit of the PLC for executing the motion control and the sequence control. The CPU unit 13 includes the microprocessor 100, the control program 230 for performing the motion control using the CAM table in which the displacement of the subordination of the electronic cam is associated with each phase of the main shaft of the electronic cam 500, and the memory stored with the CAM table 520 and the CAM table 570.

The microprocessor 100 executes the control program 230 using the CAM table 520, and outputs the execution results to the apparatus to be controlled associated with the subordination. When receiving a predetermined instruction during the execution of the control program 230, the microprocessor 100 switches the CAM table used in the execution of the control program 230 from the CAM table 520 to the CAM table 570. The microprocessor 100 outputs the execution results of the control program 230 using the CAM table 570 to the apparatus to be controlled on the basis of the switching.

The CPU unit 13 thus can rapidly carry out the switching of the CAM table.

(2) The memory includes the non-volatile memory and the volatile main memory 104. The non-volatile memory stores the CAM table 520 and the CAM table 570. The microprocessor 100 reads out the CAM table 520 and the CAM table 570 from the non-volatile memory, and develops the read CAM tables 520, 570 in the main memory 104. The microprocessor 100 executes the control program 230 using the developed CAM table 520 before receiving the predetermined instruction described above. When receiving the predetermined instruction described above after the development, the microprocessor 100 executes the control program 230 using the developed CAM table 570.

The microprocessor 100 switches the CAM table to use from the CAM table 520 to the CAM table 570 after developing the CAM tables 520, 570 in the volatile main memory 104. Thus, the CPU unit 13 can rapidly perform the switching processing of the CAM table compared to the configuration of reading out the CAM table 570 from the non-volatile memory when performing the switching.

(3) When switching the CAM table used in the execution of the control program 230 from the CAM table 520 to the CAM table 570, the microprocessor 100 executes the control program 230 using the displacement associated with the phase of the CAM table 570 greater than the phase of the CAM table 520 at the time of the switching. The CPU unit 13 then can perform the processing continued with respect to phase.

(4) The memory further stores an upper limit value related to acceleration and an upper limit value related to deceleration. If the acceleration of the apparatus to be controlled immediately after the switching is greater than the upper limit value related to acceleration, the microprocessor 100 limits the acceleration of the apparatus to be controlled to the upper limit value related to acceleration. If the deceleration of the apparatus to be controlled immediately after the switching is greater than the upper limit value related to deceleration, the microprocessor 100 limits the deceleration of the apparatus to be controlled to the upper limit value related to deceleration. The CPU unit 13 thus can prevent the movement of the apparatus to be controlled involved in rapid acceleration/deceleration not intended by the user.

(5) The memory further stores the smoothing filter for smoothing the CAM table. Immediately after the switching, the microprocessor 100 performs the smoothing processing with the smoothing filter on the displacement in the CAM table 570. The CPU unit 13 thus can realize a smooth movement of the apparatus to be controlled at the time of the switching of the CAM table.

(6) The memory also stores a high order polynomial equation of third or higher order. Immediately after the switching, the microprocessor 100 performs the smoothing processing with the high order polynomial equation on the displacement in the CAM table 570. The CPU unit 13 thus can realize a smooth movement of the apparatus to be controlled at the time of the switching of the CAM table.

(7) The microprocessor 100 performs the processing of compensating the lack of movement amount of the apparatus to be controlled that occurs when a control in which the displacement of the CAM table 570 is not output is performed in one or a plurality of CAM periods of the electronic cam in the motion control. Thus, even when executing the smoothing processing and/or when the upper limit value for acceleration or deceleration is set, for example, the CPU unit 13 can reduce or eliminate the lack of movement amount of the apparatus to be controlled.

(8) If the lack of movement amount cannot be compensated in one CAM period, the microprocessor 100 receives an instruction specifying whether to process as an error or to perform the processing of compensating the lacking amount in the next CAM period. Thus, if the lack of movement amount cannot be compensated in one CAM period, the user can select whether to stop the processing, for example, as an error or to perform the processing of compensating the lacking amount in the next CAM period.

(9) The control program 230 includes the motion computation program 234, and the user program 236 for performing the processing of giving an instruction necessary for the execution of the motion computation program 234 to the motion computation program 234. The microprocessor 100 repeats the execution of the motion computation program 234 for every constant period T1, and repeats the execution of the user program 236 for every constant period T2, which is an integral multiple of the constant period T1. The program for performing the switching in the user program 236 is described in the task of the constant period T1 or the task of the constant period T2. The control instruction for switching the CAM table thus can be described in the high priority constant period task or the low priority constant period task.

As shown in FIG. 1, the CPU unit 13 of the PLC 1 has a configuration of executing the motion control and the sequence control in the PLC system SYS. More specifically, the microprocessor 100 (see FIG. 2) of the CPU unit 13 executes the motion control and the sequence control.

However, a unit for the motion control and a unit for the sequence control may be separately arranged for the CPU unit 13, so that the motion control and the sequence control may be executed by different processors (microprocessors). That is, the processor of the unit for the motion control may execute the motion control, and the processor for the sequence control may execute the sequence control.

Alternatively, when using a processor of dual core or a processor of multi-core for the microprocessor 100, the CPU unit 13 may be configured such that one core executes the motion control and one of the remaining cores executes the sequence control.

<G. Support Device>

The PLC support device 8 for creating programs to be executed by the PLC 1, performing maintenance of the PLC 1, and the like will now be described.

Figure 24:
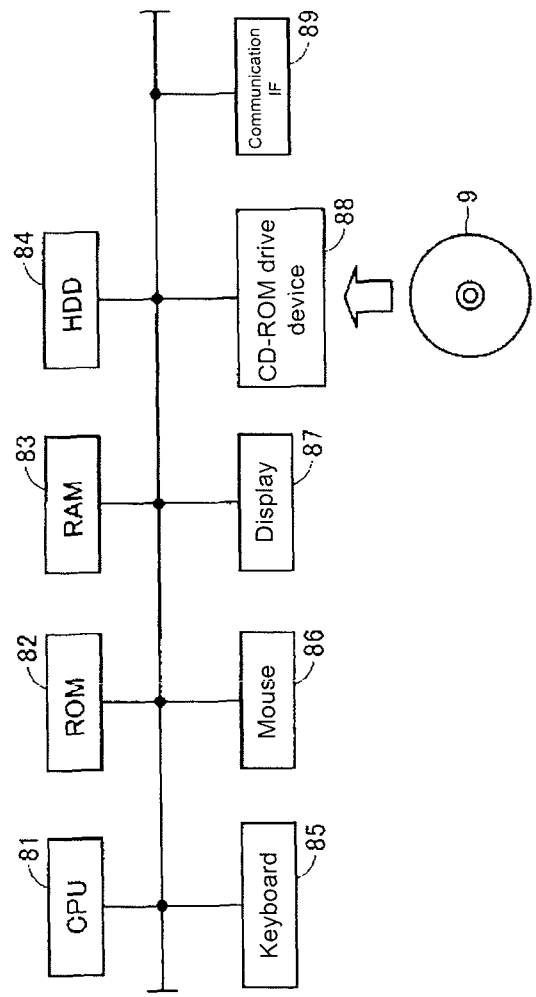
FIG. 24 is a schematic view showing a hardware configuration of the PLC support device used by being connected to the CPU unit.

FIG. 24 is a schematic view showing a hardware configuration of the PLC support device 8 used by being connected to the CPU unit according to the embodiment of the present invention. With reference to FIG. 24, the PLC support device 8 is typically configured by a general-purpose computer. A notebook personal computer that excels in portability is preferable from the standpoint of maintenance property.

With reference to FIG. 24, the PLC support device 8 includes a CPU 81 for executing various types of programs including the OS, a ROM (Read Only Memory) 82 for storing BIOS and various types of data, a memory RAM 83 for providing a work region for storing data necessary for the execution of the program in the CPU 81, and a hard disc (HDD) 84 for storing in a nonvolatile manner the program executed by the CPU 81, and the like.

The PLC support device 8 also includes a keyboard 85 and a mouse 86 for receiving the operation from the user, and the display 87 for presenting information to the user. The PLC support device 8 also includes a communication interface (IF) for communicating with the PLC 1 (CPU unit 13), and the like.

As will be hereinafter described, the various types of programs executed by the PLC support device 8 are distributed by being stored in the CD-ROM 9. The program stored by the CD-ROM 9 is read by a CD-ROM (Compact Disk-Read Only Memory) drive 88, and stored in the hard disc (HDD) 84, and the like. Alternatively, the program may be downloaded from a higher level host computer, and the like through the network.

As described above, the PLC support device 8 is realized using the general-purpose computer, and thus further detailed description will not be made.

Figure 25:
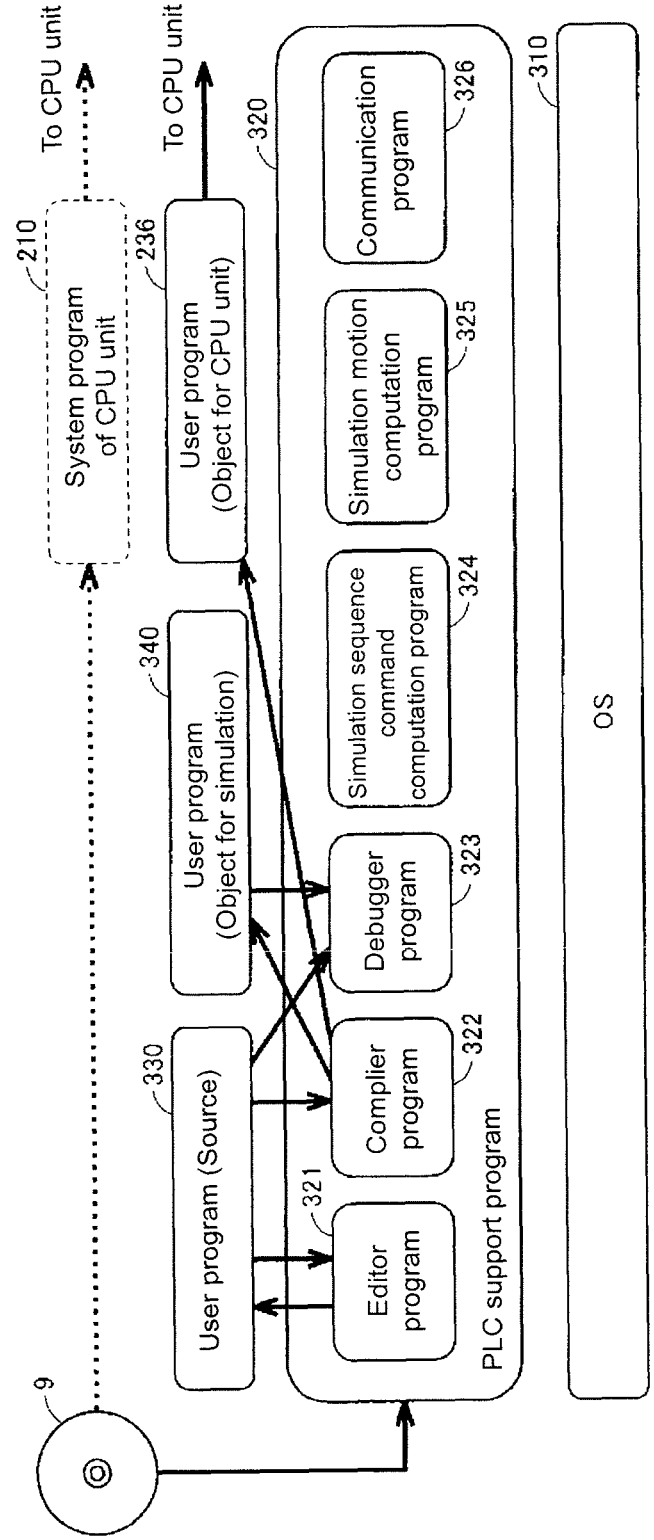
FIG. 25 is a schematic view showing a software configuration of the PLC support device used by being connected to the CPU unit.

FIG. 25 is a schematic view showing a software configuration of the PLC support device 8 used by being connected to the CPU unit according to the embodiment of the present invention. With reference to FIG. 25, the OS 310 is executed in the PLC support device 8 to provide an environment where the various types of programs contained in the PLC support program 320 can be executed.

The PLC support program 320 includes an editor program 321, a compiler program 322, a debugger program 323, a simulation sequence instruction computation program 324, a simulation motion computation program 325, and a communication program 326. Each program contained in the PLC support program 320 is typically distributed by being stored in the CD-ROM 9 and installed in the PLC support device 8.

The editor program 321 provides functions of input and edit for creating the user program 236. More specifically, in addition to the function of creating the source program 330 of the user program 236 when the user operates the keyboard 85 and the mouse 86, the editor program 321 provides the save function and the edit function of the created source program 330. The editor program 321 receives the input of the source program 330 from outside.

The compiler program 322 provides a function of compiling the source program 330 and generating the user program 236 of object program format executable by the microprocessor 100 of the CPU unit 13. The compiler program 322 also provides a function of compiling the source program 330 and generating the user program 340 of object program format executable by the CPU 81 of the PLC support device 8. The user program 340 is an object program for simulation used to simulate the operation of the PLC 1 by the PLC support device 8.

The debugger program 323 provides a function for performing debugging on the source program of the user program. The content of the debugging includes operations such as partially executing the range specified by the user in the source program, and following the temporal change of the variable value during the execution of the source program.

The debugger program 323 further provides a function of executing the user program 340, which is the object program for simulation. At the time of simulation, the simulation sequence instruction computation program 324 and the simulation motion computation program 325 included in the PLC support program 320 are used in place of the sequence instruction computation program 232 and the motion computation program 234 included in the system program of the CPU unit 13.

The communication program 326 provides a function of transferring the user program 236 to the CPU unit 13 of the PLC 1.

Generally, the system program 210 mounted on the PLC 1 is stored in the non-volatile memory 106 of the CPU unit 13 at a manufacturing stage of the CPU unit 13. However, if the system program 210 is stored in the CD-ROM 9, the user can copy the system program 210 of the CD-ROM 9 to the PLC support device 8, and transfer the copied system program 210 to the CPU unit 13 using the function provided by the communication program 326. Furthermore, if the real time OS 200 to be executed by the CPU unit 13 of the PLC 1 is stored in the CD-ROM 9, the real time OS 200 can be re-installed to the PLC 1 by user operation.

The embodiments disclosed herein are illustrative in all aspects and should not be recognized as being restrictive. The scope of the present invention is defined by the Claims rather than by the description made above, and the meaning equivalent to the Claims and all modifications within the scope are intended to be enclosed herein.

DESCRIPTION OF SYMBOLS

1 PLC
2 field network
3 servo motor driver
4 servo motor
5 terminal
6 detection switch
7 relay
8 PLC support device
10 connection cable
11 system bus
12 power supply unit
13, 14, 53 unit
15 special unit
19 encoder
51 terminal bus
52 communication coupler
83 RAM
87 display
100 microprocessor
102 chip set
104 main memory
106 nonvolatile memory
108 system timer
110 connector
120 system bus controller
122, 142 control circuit
124 system bus control circuit
126, 146 buffer memory
130 system bus connector
140 field network controller
144 field network control circuit
200 real time OS
210, 220 system program
212 scheduler program
230 control program
232 sequence instruction computation program
234 motion computation program 236, 340 user program
320 support program
400 main shaft
500 electronic cam
500A mechanical CAM
501 electronic cam computation unit
502 interpolation unit
503 switch unit
504 CAM table reading unit
505 smoothing processing unit
510, 560, 560A CAM curve
520, 570, 570A CAM table
600 driven shaft
ME CAM mechanism
SYS system

The invention claimed is:

1. A computation unit of a programmable logic controller configured to execute a motion control and a sequence control, the computation unit comprising:
a processor; and
a memory configured to store a program for performing the motion control using a computer aided manufacturing (CAM) table in which a displacement of a driven shaft of an electronic cam is associated with each phase of a main shaft of the electronic cam, and a first CAM table and a second CAM table serving as the CAM table, wherein
the processor is configured to:
execute the program using the first CAM table, and output execution results to an apparatus to be controlled associated with the driven shaft,
switch, when receiving a predetermined instruction during the execution of the program, the CAM table used in the execution of the program from the first CAM table to the second CAM table,
output the execution results of the program using the second CAM table to the apparatus to be controlled based on the switching; and
execute the program using a displacement associated with a phase of the second CAM table, the phase of the second CAM table being greater than a phase in the first CAM table at the time of switching when switching the CAM table used in the execution of the program from the first CAM table to the second CAM table,
the first and second CAM tables correspond to different relationships between a phase of the main shaft and a displacement of the driven shaft, and
in the switching, the second CAM table is switched with the first CAM table while an electronic cam operation is being performed using the first CAM table.

2. The computation unit according to claim 1, wherein the memory comprises a nonvolatile memory and a volatile memory;
the nonvolatile memory stores the first CAM table and the second CAM table, and
the processor is configured to:
read out the first CAM table and the second CAM table from the nonvolatile memory and develop the read CAM tables in the volatile memory,
execute the program using the developed first CAM table before receiving the predetermined instruction, and
execute the program using the developed second CAM table when receiving the predetermined instruction after the development.

3. The computation unit according to claim 1, wherein
the memory further stores an upper limit value related to acceleration and an upper limit value related to deceleration, and
the processor is configured to:
limit the acceleration of the apparatus to be controlled to the upper limit value related to acceleration when the acceleration of the apparatus to be controlled immediately after the switching is greater than the upper limit value related to acceleration, and
limit the deceleration of the apparatus to be controlled to the upper limit value related to deceleration when the deceleration of the apparatus to be controlled immediately after the switching is greater than the upper limit value related to deceleration.

4. The computation unit according to claim 3, wherein
the processor is configured to perform processing of compensating lack of movement amount of the apparatus to be controlled that occurs when a control in which the displacement of the second CAM table is not output is performed in one or a plurality of CAM periods of the electronic cam in the motion control.

5. The computation unit according to claim 4, wherein the processor receives an instruction specifying whether to process as an error or to perform the processing of compensating the lacking amount in the next CAM period if the lack of movement amount cannot be compensated in the one CAM period.

6. The computation unit according to claim 1, wherein
the memory further stores a smoothing filter configured to smooth the CAM table; and
the processor performs smoothing processing with the smoothing filter on the displacement in the second CAM table immediately after the switching.

7. The computation unit according to claim 1, wherein
the memory further stores a high-order polynomial equation of third or higher orders, and
the processor is configured to perform the smoothing processing with the high order polynomial equation on the displacement in the second CAM table immediately after the switching.

8. The computation unit according to claim 1, wherein
the program includes a motion computation program, and a user program for performing the processing of giving an instruction necessary for the execution of the motion computation program to the motion computation program,
the processor is configured to,
repeat the execution of the motion computation program for every first constant period, and
repeat the execution of the user program for every second constant period, which is an integral multiple of the first constant period, and
the program for performing the switching in the user program is described in a task of the first constant period or a task of the second constant period.

9. A computation unit of a programmable logic controller configured to execute a motion control and a sequence control, the computation unit comprising:
a processor; and
a memory configured to store a program for performing the motion control using a computer aided manufacturing (CAM) table in which a displacement of a driven shaft of an electronic cam is associated with each phase of a main shaft of the electronic cam, and a first CAM table and a second CAM table serving as the CAM table, wherein the processor is configured to:
execute the program using the first CAM table, and output execution results to an apparatus to be controlled associated with the driven shaft,
switch, when receiving a predetermined instruction in middle of one period of the motion control during the execution of the program, the CAM table used in the execution of the program from the first CAM table to the second CAM table in the middle of the one period, and
output the execution results of the program using the second CAM table to the apparatus to be controlled based on the switching,
the first and second CAM tables correspond to different relationships between a phase of the main shaft and a displacement of the driven shaft, and
in the switching, the second CAM table is switched with the first CAM table while an electronic cam operation is being performed using the first CAM table.

10. The computation unit according to claim 9, wherein when switching the CAM table used in the execution of the program from the first CAM table to the second CAM table, the processor executes the program using a displacement associated with a phase in the second CAM table, the phase of the second CAM table being greater than a phase in the first CAM table at the time of the switching.

11. An output control method in a computation unit of a programmable logic controller configured to execute a motion control and a sequence control,
the computation unit storing a program for performing the motion control using a computer aided manufacturing (CAM) table in which a displacement of a driven shaft of an electronic cam is associated with each phase of a main shaft of the electronic cam, and a first CAM table and a second CAM table serving as the CAM table,
the output control method comprising:
a processor of the computation unit executing the program using the first CAM table, and outputting execution results to an apparatus to be controlled associated with the driven shaft;
the processor, when receiving a predetermined instruction during the execution of the program, switching a CAM table used in the execution of the program from the first CAM table to the second CAM table;
the processor outputting the execution results of the program using the second CAM table to the apparatus to be controlled based on the switching; and
the processor executing the program using a displacement associated with a phase of the second CAM table, the phase of the second CAM table being greater than a phase in the first CAM table at the time of switching when switching the CAM table used in the execution of the program from the first CAM table to the second CAM table,
wherein
the first and second CAM tables correspond to different relationships between a phase of the main shaft and a displacement of the driven shaft, and
in the switching, the second CAM table is switched with the first CAM table while an electronic cam operation is being performed using the first CAM table.

12. An output control method in a computation unit of a programmable logic controller configured to execute a motion control and a sequence control,
the computation unit storing a program for performing the motion control using a computer aided manufacturing (CAM) table in which a displacement of a driven shaft of an electronic cam is associated with each phase of a main shaft of the electronic cam, and a first CAM table and a second CAM table serving as the CAM table,
the output control method comprising:
a processor of the computation unit executing the program using the first CAM table, and outputting execution results to an apparatus to be controlled associated with the driven shaft;
the processor, when receiving a predetermined instruction in middle of one period of the motion control during the execution of the program, switching the CAM table used in the execution of the program from the first CAM table to the second CAM table in the middle of the one period; and
the processor outputting the execution results of the program using the second CAM table to the apparatus to be controlled based on the switching,
wherein
the first and second CAM tables correspond to different relationships between a phase of the main shaft and a displacement of the driven shaft, and
in the switching, the second CAM table is switched with the first CAM table while an electronic cam operation is being performed using the first CAM table.

13. A program for controlling a computation unit of a programmable logic controller configured to execute a motion control and a sequence control,
the computation unit storing a program for performing the motion control using a computer aided manufacturing (CAM) table in which a displacement of a driven shaft of an electronic cam is associated with each phase of a main shaft of the electronic cam, and a first CAM table and a second CAM table serving as the CAM table,
the program causing the computation unit to perform:
executing the program using the first CAM table, and outputting execution results to an apparatus to be controlled associated with the driven shaft;
switching a CAM table used in the execution of the program from the first CAM table to the second CAM table when receiving a predetermined instruction during the execution of the program;
outputting the execution results of the program using the second CAM table to the apparatus to be controlled based on the switching; and
executing the program using a displacement associated with a phase of the second CAM table, the phase of the second CAM table being greater than a phase in the first CAM table at the time of switching when switching the CAM table used in the execution of the program from the first CAM table to the second CAM table,
wherein
the first and second CAM tables correspond to different relationships between a phase of the main shaft and a displacement of the driven shaft, and
in the switching, the second CAM table is switched with the first CAM table while an electronic cam operation is being performed using the first CAM table.

14. A program for controlling a computation unit of a programmable logic controller configured to execute a motion control and a sequence control,
the computation unit storing a program for performing the motion control using a computer aided manufacturing (CAM) table in which a displacement of a driven shaft of an electronic cam is associated with each phase of a main shaft of the electronic cam, and a first CAM table and a second CAM table serving as the CAM table, the program causing the computation unit to perform:

executing the program using the first CAM table, and outputting execution results to an apparatus to be controlled associated with the driven shaft;

switching, when receiving a predetermined instruction in middle of one period of the motion control during the execution of the program, the CAM table used in the execution of the program from the first CAM table to the second CAM table in the middle of the one period; and outputting the execution results of the program using the second CAM table to the apparatus to be controlled based on the switching, wherein the first and second CAM tables correspond to different relationships between a phase of the main shaft and a displacement of the driven shaft, and in the switching, the second CAM table is switched with the first CAM table while an electronic cam operation is being performed using the first CAM table.

* * * * *